US009348640B2

(12) United States Patent
Horii

(10) Patent No.: US 9,348,640 B2
(45) Date of Patent: May 24, 2016

(54) TRANSACTION PROCESSING SYSTEM, METHOD AND PROGRAM

(75) Inventor: Hiroshi Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 13/563,791

(22) Filed: Aug. 1, 2012

(65) Prior Publication Data

US 2013/0036136 A1 Feb. 7, 2013

(30) Foreign Application Priority Data

Aug. 1, 2011 (JP) ................................. 2011-168461

(51) Int. Cl.
*G06F 17/30* (2006.01)
*G06F 9/46* (2006.01)

(52) U.S. Cl.
CPC .......... *G06F 9/466* (2013.01); *G06F 17/30348* (2013.01)

(58) Field of Classification Search
CPC .............. G06F 17/30348; G06F 9/466; G06F 17/30194
USPC .......................................... 707/634, 638, 827
See application file for complete search history.

(56) References Cited

U.S. PATENT DOCUMENTS

| 6,499,036 | B1 * | 12/2002 | Gurevich | .............. | G06F 9/4435 |
| | | | | | 707/778 |
| 2004/0064439 | A1 * | 4/2004 | Hinshaw | ........... | G06F 17/30348 |
| 2011/0313973 | A1 * | 12/2011 | Srivas | ............... | G06F 17/30194 |
| | | | | | 707/634 |
| 2012/0109895 | A1 * | 5/2012 | Zwilling | ............. | G06F 11/1471 |
| | | | | | 707/648 |

FOREIGN PATENT DOCUMENTS

JP 2007-188518 A 7/2007

OTHER PUBLICATIONS

Higa et al."How to fully use Open-Source: Slim3 on Google App Engine for Java", pp. 241-251.
Mike Burrows, "The Chubby lock service for loosely-coupled distributed systems", OSDI '06 Proceedings of the 7th symposium on Operating systems design and implementation, pp. 335-350, 2006.
Daniel Peng and Frank Dabek, "Large-scale Incremental Processing Using Distributed Transactions and Notifications", 9th USENIX Symposium on Operating Systems Design and Implementation, 2010.

* cited by examiner

*Primary Examiner* — Sheree Brown
(74) *Attorney, Agent, or Firm* — Scully, Scott, Murphy & Presser, P.C.; Jeff Tang, Esq.

(57) ABSTRACT

A system and method of implementing distributed transactions on a KVS having a simple configuration without unnecessarily causing rollbacks. The method includes providing a management map including a global transaction ID as a key and {a state of global transaction, a waiting global transaction ID list} as a value, starting a management local transaction on one of the plurality of servers, inserting a key-value pair including an ID of the global transaction to be processed as a key and {a state "working", null} as a value into the management map in the management local transaction, and updating a value having the ID of the global transaction to be processed as a key to {a state "waiting", a waiting global transaction ID list for the global transaction to be processed} on the management map in the management local transaction and committing the management local transaction.

11 Claims, 17 Drawing Sheets

1. START Tx1

TRANSACTION ON APPLICATION          TRANSACTION ON KVS

| KEY | STATE | WAITING | |
|---|---|---|---|
| Tx1 | Working | {} | ← 412a |

| KEY | WRITING | READING | |
|---|---|---|---|
| | | {} | ← 410a |

2. Tx1 ACQUIRES SHARED LOCK K1

| KEY | STATE | WAITING | |
|---|---|---|---|
| Tx1 | Working | {} | ← 412a |

| KEY | WRITING | READING | |
|---|---|---|---|
| K1 | | {Tx1} | ← 410a |

3. COMMIT PROCESS 1 OF Tx1

| KEY | STATE | WAITING | |
|---|---|---|---|
| Tx1 | Committed | {} | ← 412a |

| KEY | WRITING | READING | |
|---|---|---|---|
| K1 | | {Tx1} | ← 410a |

4. COMMIT PROCESS 2 OF Tx1

| KEY | STATE | WAITING | |
|---|---|---|---|
| Tx1 | Committed | {} | ← 412a |

| KEY | WRITING | READING | |
|---|---|---|---|
| K1 | | {} | ← 410a |

1. Tx1 IS QUERYING K1

2. Tx2 STARTS TO ACQUIRE SHARED LOCK K1

3. AFTER END OF COMMIT PROCESS OF Tx1

4. Tx2 RESTARTS TO ACQUIRE SHARED LOCK K1

5. Tx2 STARTS UPDATE PROCESS

1. Tx2 IS WAITING FOR Tx1 TO COMMIT

2. Tx3 STARTS TO UPDATE K2 BEING QUERIED BY Tx2

3. Tx3 IS WAITING FOR Tx1

4. AFTER END OF TX1, TX3 WAITS FOR TX2

1. Tx2 AND Tx3 WAIT FOR Tx1

2. Tx1 ATTEMPTS TO UPDATE VALUE BEING QUERIED BY Tx3

3. Tx1 ROLLS BACK BECAUSE Tx1 IS CONTAINED IN WAITING OF Tx3

4. AFTER ROLLBACK OF Tx1, Tx3 WAITS FOR Tx2

TRANSACTION PROCESSING SYSTEM, METHOD AND PROGRAM

CROSS-REFERENCE TO RELATED APPLICATION

This application claims priority under 35 U.S.C. §119 from Japanese Patent Application No. 2011-168461 filed Aug. 1, 2011, the entire contents of which are incorporated herein by reference.

BACKGROUND OF THE INVENTION

1. Field of the Invention

The present invention relates to processing of transactions on a distributed processing system, in particular, on a distributed database system and, more specifically, to processing of transactions in a Key Value Store (hereinafter abbreviated as KVS).

2. Description of Related Art

Distributed database systems are well known and employ conventional techniques. JP2007-188518A relates to distributed database systems that use ownership groups and discloses a step of changing data that indicates ownership of a data item that is an atomic operation.

Distributed database systems generally implement relational databases and use syntaxes such as SQL syntaxes in querying.

More recently, database management software called key value store (KVS) has come into use. This architecture manages maps to store pairs of key and value and allows its application to read a value of a map by specifying the key and write a value of a map with the key. This simple architecture enables low latency for search/update operations and high scalability to increase the performance according to the number of severs. To provide database service with low latency and high throughput, therefore, distributed KVS that can distribute data across multiple servers has been also implemented.

In a simple implementation of KVS, the atomicity and isolation of processes are limited to small processing units. For example, in KVS systems such as memcached and Redis, the atomicity and isolation are guaranteed only for single query/update operation. In WebSphere eXtreme Scale and Google App Engine, the atomicity and isolation are guaranteed only for query/update operations on data managed by only one server. However, when an application performs update operations on data on multiple servers, guaranteeing atomicity and isolation for the operations can be mandatory.

On the other hand, with distributed lock systems, atomicity and isolation for the operations on data managed by multiple servers can be guaranteed, as in conventional distributed databases. However, additional distributed lock systems cause additional complexity for the entire system and lose characteristics of simple implementations of KVS. Specifically, implementing a distributed lock mechanism that covers multiple servers in key value stores with the capabilities of the key value stores is absolutely necessary.

Distributed transactions can be implemented on the KVS by handling each operation of transactions (global transactions) on an application as multiple transactions (local transactions) on the KVS. The transaction is as follows:

First, a state of a lock (ID of a global transaction that holds a lock and the type of the lock), a committed value, and a value being updated are provided as a value of KVS.
A management map is provided on the KVS to manage global transactions. When a global transaction is started, the state of the global transaction is added to the management map as a local transaction.
A query/update process is processed as a local transaction. For each query/update operation in a global transaction, the state of a lock, a committed value, and a value being updated are queried/updated as a local transaction.
A commit/rollback operation in a global transaction is processed as multiple local transactions. The transaction state of the global transaction in the management map is updated as a local transaction, and each queried/updated value of KVS (the state of a lock, a committed value and a value being updated) is also updated as a local transaction.

An example of such an approach is one described in "How to fully use Open-Source: Slim3 on Google App Engine for Java" by Yasuo Higa and Shin-ichi Ogawa, Shuwa System, pp. 241-251. The literature describes how to implement global transactions with Google App Engine.

Also, Google Percolator is described in http://research-.google.com/pubs/pub36726.html.

The existing methods provide a management map on KVS to manage states (Working, Committed and Aborted) of transactions by taking into account an abortion of an application. If the state of a global transaction that is likely to hold a lock for a value is Committed or Aborted, a committed value or a value not updated, respectively, is made available for the other global transactions. However, whenever contention for a lock occurs in such a system, a rollback needs to be performed in order to guarantee isolation.

Google Chubby, described in http://labs.google.com/papers/chubby.html, uses a distributed lock mechanism to enable implementation of distributed transactions. However, building additionally a distributed lock mechanism requires extra software development and management costs.

The present invention eliminates the need for taking into consideration the partitioning of key-value pairs in a simple KVS and therefore increases the versatility of the KVS. In the past, credit transfer applications cannot use a simple KVS in the case where data is divided among multiple servers on a user-ID by user-ID basis. The present invention enables implementation of distributed transactions on KVS without needing to implement an extra distributed lock mechanism.

Moreover, transaction processing for a management map and transaction processing for an application map according to the present invention can increase throughput with an increased number of servers. When lock contention occurs, a transaction is caused to wait for the lock and therefore overhead is low. The present invention has the effect of reducing unintended rollbacks by maintaining an exclusive lock of a management map during a transaction.

SUMMARY OF THE INVENTION

In one aspect of the invention, in a distributed key value store system which includes a plurality of servers, each having an exclusive control mechanism, and in which transaction atomicity and isolation on each of the servers are guaranteed, a distributed key-value-store system control method for implementing global transaction processing that preserves transaction atomicity and isolation on all of the servers by combining local transaction processes on the servers is provided. The method includes the steps of providing beforehand a management map including a global transaction ID as a key and {a state of global transaction, a waiting global transaction ID list} as a value before any global transaction is started, starting a management local transaction on one of the plurality of servers by processing by the computer when a global transaction to be processed is started, inserting a key-value pair including an ID of the global transaction to be processed as a key and {a state "working", null} as a value into the management map in the management local transaction, and updating a value having the ID of the global transaction to be processed as a key to {a state "waiting", a waiting global transaction ID list for the global transaction to be processed} on the management map in the management local transaction and committing the management local transaction.

In another aspect of the invention, in a distributed key value store system which includes a plurality of servers having an exclusive control mechanism and in which transaction atomicity on each of the servers is guaranteed, a non-transitory computer readable storage medium tangibly embodying a computer readable program code having computer readable instructions which, when implemented, cause a computer to carry out the steps of a method of global transaction processing that preserves transaction atomicity and isolation on all of the servers by combining local transaction processes on the servers is provided. The method includes the steps of providing beforehand a management map including a global transaction ID as a key and {a state of global transaction, a waiting global transaction ID list} as a value before any global transaction is started, starting a management local transaction on one of the plurality of servers by processing by the computer when a global transaction to be processed is started, inserting a key-value pair including an ID of the global transaction to be processed as a key and {a state "working", null} as a value into the management map in the management local transaction, and updating a value having the ID of the global transaction to be processed as a key to {a state "waiting", a waiting global transaction ID list for the global transaction to be processed} on the management map in the management local transaction and committing the management local transaction.

In yet another aspect of the invention, in a distributed key value store system which includes a plurality of servers having an exclusive control mechanism and in which transaction atomicity on each of the servers is guaranteed, a system which implements global transaction processing that preserves transaction atomicity and isolation on all of the servers by combining local transaction processes on the servers is provided. The system includes a memory unit, means for providing in the memory beforehand a management map including a global transaction ID as a key and {a state of global transaction, a waiting global transaction ID list} as a value before any global transaction is started, means for starting a management local transaction on one of the plurality of servers by processing by a computer when a global transaction to be processed is started, means for inserting a key-value pair including an ID of the global transaction to be processed as a key and {a state "working", null} as a value into the management map in the management local transaction, and means for updating a value having the ID of the global transaction to be processed as a key to {a state "waiting", a waiting global transaction ID list for the global transaction to be processed} on the management map in the management local transaction and committing the management local transaction.

DETAILED DESCRIPTION OF THE PREFERRED EMBODIMENTS

Figure 1:
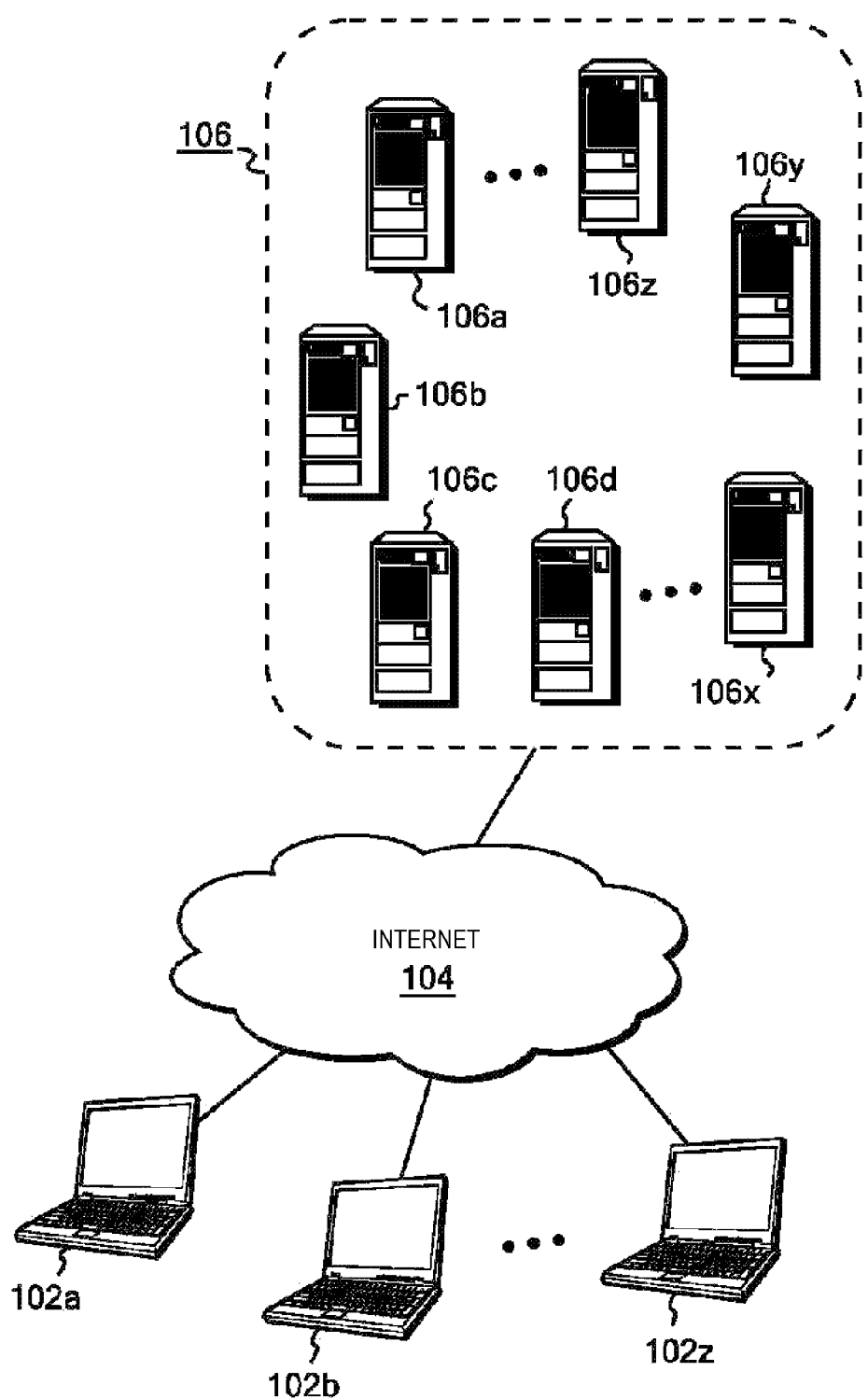
FIG. 1 is a schematic diagram of an entire system for carrying out the present invention.

An object of the present invention is to implement distributed transactions on a KVS having a simple configuration without unnecessarily causing rollbacks. The present invention solves the problem by using an exclusive control mechanism of each server to maintain lock dependency between global transactions on a distributed KVS which guarantees atomicity and isolation for local transactions on each server while using an exclusive control mechanism of the KVS to recognize a lock release wait status.

More specifically, a system of the present invention provides a management map including a global transaction ID as a key and a value, {state of global transaction, waiting global transaction ID list}.

In an operation for starting a global transaction identified with a global transaction ID, [TxID], the system of the present invention starts a local transaction for management (management local transaction) on a server that manages the key [TxID] on the management map on the KVS. Then, the system inserts a key-value pair including [TxID] as the key and {working, null} as the value in the management local transaction. The management local transaction does not end until the end (commit or rollback) of the global transaction or until the global transaction enters a state in which it waits for another global transaction to release a lock.

In an operation for the global transaction identified with the global transaction ID, [TxID] to wait for the end of a transaction with [waiting TxID], the system of the present invention updates the value associated with the key [TxID] to {waiting, [waiting TxID]} in the management local transaction and commits the management local transaction. Then, the system starts a local transaction to wait for the end of the global transaction identified with [waiting TxID] (wait-for-lock-release local transaction) on a server that manages the key [waiting TxID] on the management map and queries the value associated with the key [waiting TxID].

Here, if the queried value is not found or the state of the global transaction in the value is "committed" or "aborted", the system of the present invention commits a wait-for-lockrelease local transaction, restarts the management local transaction, updates the value associated the key [TxID] to {working, null}, and notifies that the lock contention has ended (there is a possibility that contention has occurred again).

On the other hand, when the state of [waiting TxID] in the queried value is "waiting" and there is an additional waiting TxID list as a value, the system of the present invention commits the wait-for-lock-release local transaction and adds the waiting TxID list to the waiting TxID list for [TxID] to generate a new waiting TxID list for [TxID]. Then the system restarts the management local transaction on the server that manages [TxID] as a key, updates the state of the global transaction with [TxID] to "waiting", updates the waiting TxID list for [TxID] to the newly generated list, and commits. After the commit, the system performs waiting processing for the global transaction associated with TxID at the end of the newly generated waiting TxID list for [TxID]. If [TxID] is contained in the newly generated waiting TxID list for [TxID], the system performs a rollback process and notifies the application of the rollback. There is a possibility of deadlock.

When committing or rolling back a transaction, the system of the present invention updates a value having [TxID] as a key to {committed, null} or {aborted, null} in the management local transaction and commits the management local transaction.

An embodiment of the present invention will be described with reference to the drawings. Like reference numerals denote like elements through the drawings unless otherwise stated. It should be noted that the following is a description of an embodiment of the present invention and is not intended to limit the present invention to specifics described with the embodiment.

FIG. 1 is a schematic diagram generally showing an entire system for carrying out the present invention. A plurality of client computers 102a, 102b, . . . , 102z in FIG. 1 access a distributed processing system 106 through the Internet according to a protocol such as HTTP.

The distributed processing system 106 includes a plurality of servers 106a, 106b, . . . , 106z which are interconnected through a structure such as a LAN or WAN. The distributed server system 106 is a system that uses a key-value store (KVS) system to build a distributed database. IDs are assigned to the servers 106a, 106b, . . . , 106z and preferably, but not limited to, the mod of a hash value of a key is calculated to uniquely determine the server that holds the key.

Accordingly, a server 106a, 106b, . . . , 106z to access by any of the client computers 102a, 102b, . . . , 102z is determined by a key queried. One of the servers 106a, 106b, . . . , 106z is a server called catalogue server, where keys and other information that are stored in other servers are stored. The client computers 102a, 102b, . . . , 102z first access the catalogue server to obtain information indicating which of the servers 106a, 106b, . . . , 106z is to be accessed and then establish a connection to the server indicated. Alternatively, any of the servers that have been accessed by a client computer can broadcast to a plurality of other servers to obtain information. For convenience, the following description starts where a client computer has found an intended server and established a connection to the server.

Each of the client computers 102a, 102b, . . . , 102z generate a unique global transaction ID in order to access the distributed processing system 106 and uses the global transaction ID for a subsequent transaction with the distributed processing system 106.

Figure 2:
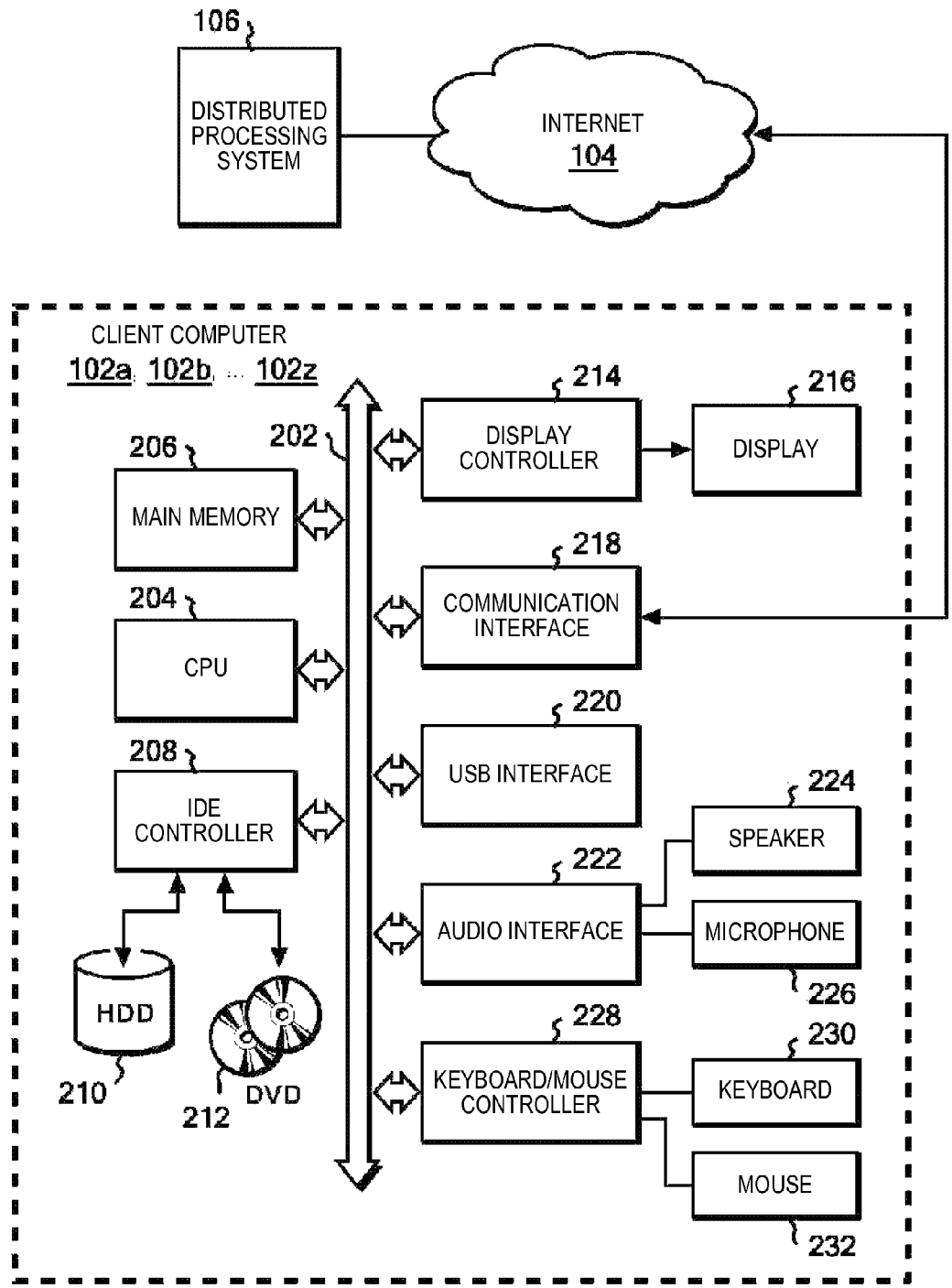
FIG. 2 is a schematic block diagram of hardware of a client computer.

A hardware configuration of a client computer out of the client computers denoted by reference numerals 102a, 102b, . . . , 102z in FIG. 1 will be described with reference to FIG. 2. The client computer in FIG. 2 includes a main memory 206, a CPU 204, and an IDE controller 208, which are connected to a bus 202. A display controller 214, a communication interface 218, a USB interface 220, an audio interface 222, and a keyboard/mouse controller 228 are also connected to the bus 202. A hard disk drive (HDD) 210 and a DVD drive 212 are connected to the IDE controller 208. The DVD drive 212 is used for installing a program from a CD-ROM or a DVD as necessary. Preferably, a display device 216 having an LCD screen is connected to the display controller 214. A screen of an application is displayed on the display device 216 through a Web browser.

Devices such as an extended hard disk can be connected to the USB interface 220 as necessary. A keyboard 230 and a mouse 232 are connected to the keyboard/mouse controller 228. The keyboard 230 is used for typing in key data for a search, a password and other information. The CPU 204 can be any CPU that is based on a 32-bit architecture or a 64-bit architecture.

At least an operating system and a client application program 402 (FIG. 4) for accessing the distributed processing system 106 are stored in the hard disk drive 210. On startup of the system, the operating system is loaded into the main memory 206. The client application program 402a will be described later in detail with reference to a block diagram of FIG. 4 and flowcharts of FIGS. 9 to 14.

The communication interface 218 uses TCP/IP communication facilities provided by the operating system to communicate with the distributed processing system 106 through the Internet 104 according to conventional protocols.

Figure 3:
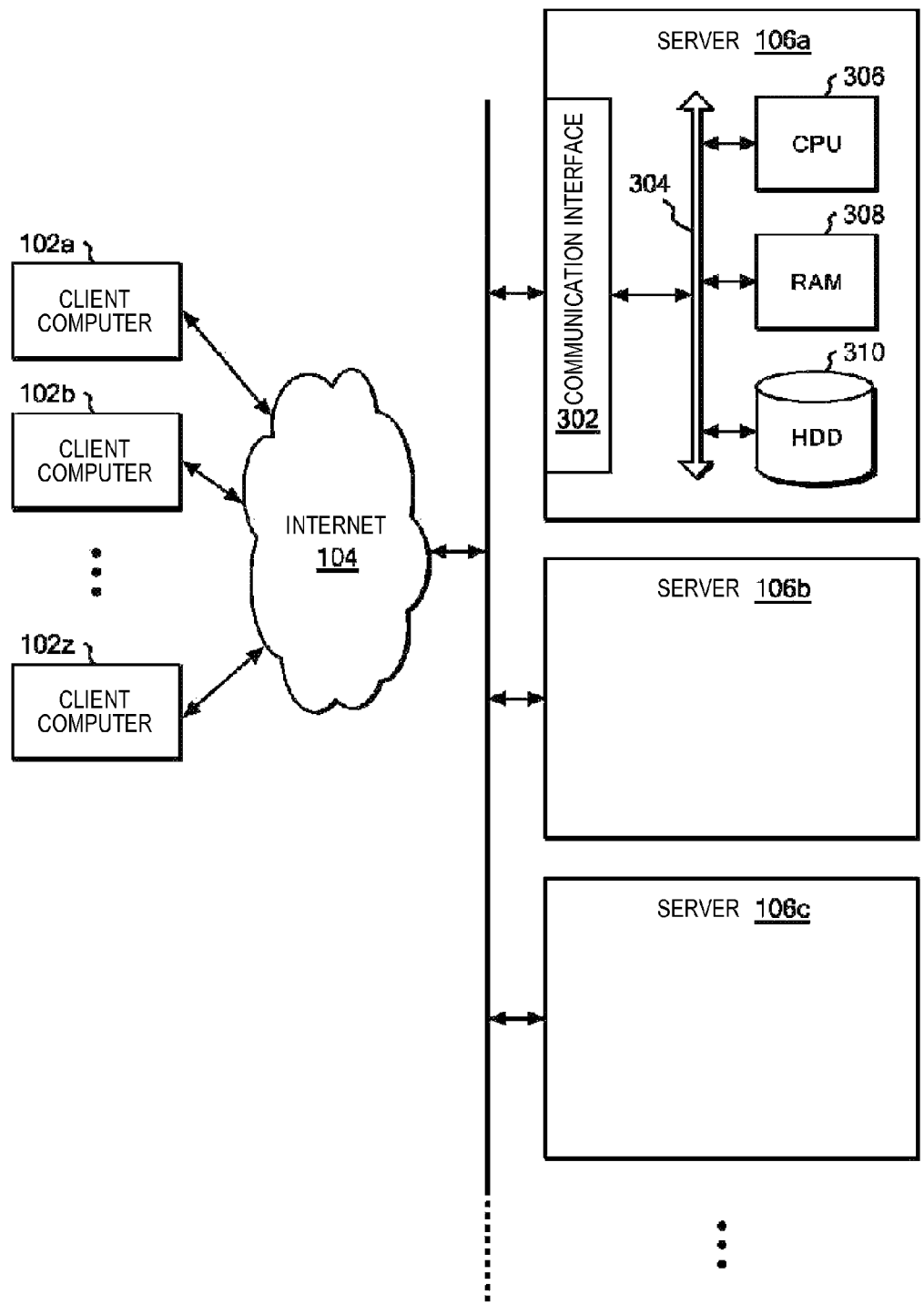
FIG. 3 is a schematic block diagram of hardware of a server.

FIG. 3 is a schematic block diagram of a hardware configuration of a server such as the server 106a in the distributed processing system 106. As illustrated, servers 106a, 106b, . . . , 106z are connected through the Internet 104. The servers 106a, 106b, . . . , 106z have basically the same configuration and therefore the server 106a will be illustrated here as a representative example. As illustrated in FIG. 3, client computers 102a, 102b, . . . , 102z are connected to a communication interface 302 of the server 106a through the Internet 104. The communication interface 302 is connected to a bus 304, to which a CPU 306, a main memory (a RAM) 308, and a hard disk drive (HDD) 310 are connected.

Although not depicted, a keyboard, a mouse and a display are also connected to the server 106a and can be used by maintenance personnel to manage and maintain the entire server 106a. An operating system is stored in the hard disk drive 310 of the server 106a.

Software programs, such as Apache, for causing the server 106a to function as a Web server, Java EE, which provides a Java virtual environment, and an application program 402a according to the present invention, which runs in the Java virtual environment, are also stored in the hard disk drive 310. These programs are loaded into and run on the main memory 308 on startup of the server 106a. This enables the client computer 102a, 102b, . . . , 102z to access the server 106a according to TCP/IP protocols.

Software for implementing a KVS, is also stored in the hard disk drive 310 of the server 106a. A KVS transaction processing program 406a (FIG. 4) according to the present invention is also stored in the hard disk drive 310. A function of the transaction processing program 406a will be described later in detail with reference to the block diagram of FIG. 4 and the flowcharts of FIGS. 9 to 14.

Figure 4:
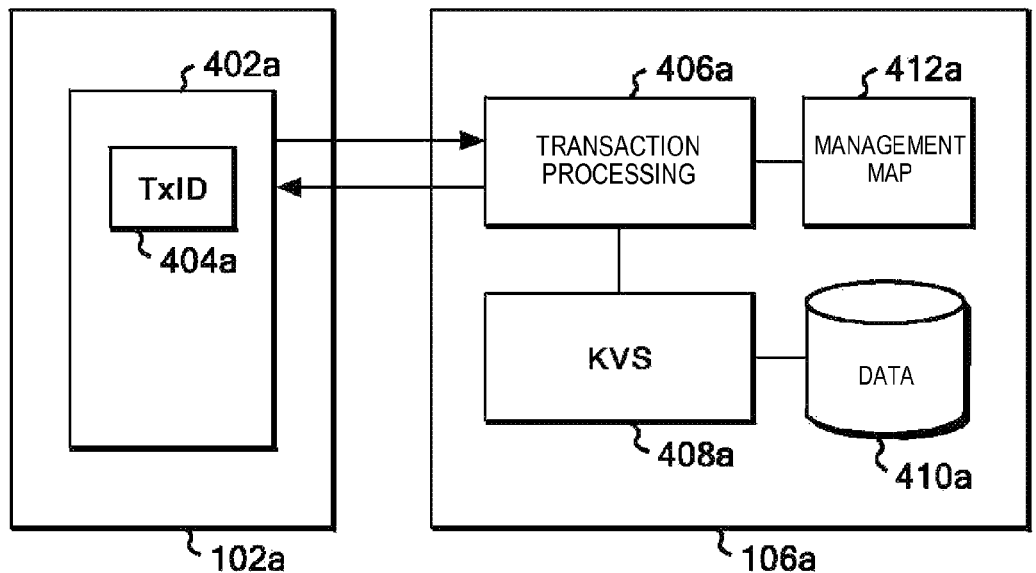
FIG. 4 is a functional block diagram of the client computer and the server.

FIG. 4 is a schematic block diagram of a processing program on the client computers 102a, 102b, . . . , 102z and a processing program on the servers 106a, 106b, . . . , 106z.

Here, the client computer 102a and the server 106a are illustrated as representative examples.

The client computer application program 402a is stored in the hard disk drive 210, and loaded into and executed on the main memory 206 in response to a predetermined operation by a user of the client computer. The client computer application program 402a has the function of directing a KVS system provided on a server from the client computer to start a transaction, query data, update data, commit, and perform other processing.

The application program 402a has the function 404a of generating a global transaction ID (TxID) that is unique across the entire system. An example of a method for generating a global transaction ID is to assign a unique ID to each of the client computers 102a, 102b, . . . , 102z and each of the servers 106a, 106b, . . . , 106z and, every time a client computer starts a transaction, add a serial number that is in the client computer and is incremented to the ID of the client computer to generate a global transaction ID. However, any method can be used to generate a global transaction ID that is unique across the entire system.

The application program 402a can generate a global transaction ID and access the server 106a and generate other global transaction IDs to access a plurality of servers at a time.

A transaction processing program 406a, a KVS program 408a, and a pair of key (KEY) and value (VALUE) that are referred to by the KVS program 408a are stored in the hard disk drive 310 of the server 106a. The transaction processing program 406a and the KVS program 408a are loaded into and run on the main memory 308 upon startup of the server 106a.

In response to a request with a global transaction ID from the client computer 102a, the transaction processing program 406a controls the KVS program 408a so as to perform an operation such as locking of a record or rollback, generates a management map 412a which has an entry including the global transaction ID, a state, and a waiting global transaction ID preferably in the main memory 308, and maintains the management map 412a for each server.

Before describing a configuration and operation of a KVS system according to the present invention, configurations and operations of a number of typical conventional KVS systems will be described. Features of the system according to the present invention will be more apparent by referring to these configurations and operations.

Figure 5:
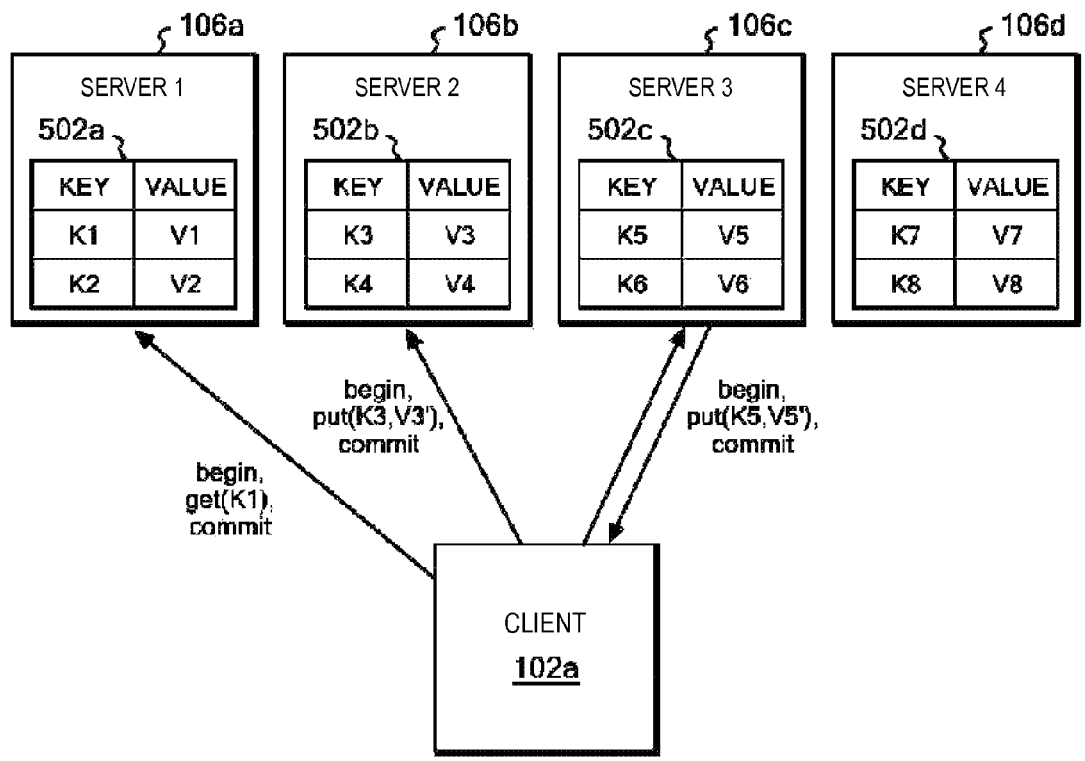
FIG. 5 is a diagram generally showing a conventional KVS system.

FIG. 5 is a diagram illustrating a configuration of a typical conventional KVS. Data is divided into pieces, data 502a, 502b, 502c and 502d, as illustrated and are distributed across a plurality of servers 102a, 102b, 102c and 102d. A client computer 102a requests one server to perform transaction processing. The data is distributed in such a manner that the pieces of data are disjoint. The servers on which the data is placed are preferably determined by calculating the mod of a hash value of a key.

The client computer 102a sends a command such as begin (to start a transaction), put (to associate a value), get (to acquire a corresponding value), and commit (to commit, that is, confirm an update) to a server that is determined by the value of a key to request the server to perform processing.

The KVS having the conventional configuration described above does not support distributed transactions and therefore cannot be used in a case where an update range in each transaction is complicated. Examples in which an update range in a transaction is complicated are a bank account transfer, especially in the case where the balances on accounts are distributed, and an online shopping site where histories of accounts and goods stock quantities are distributed.

Figure 6:
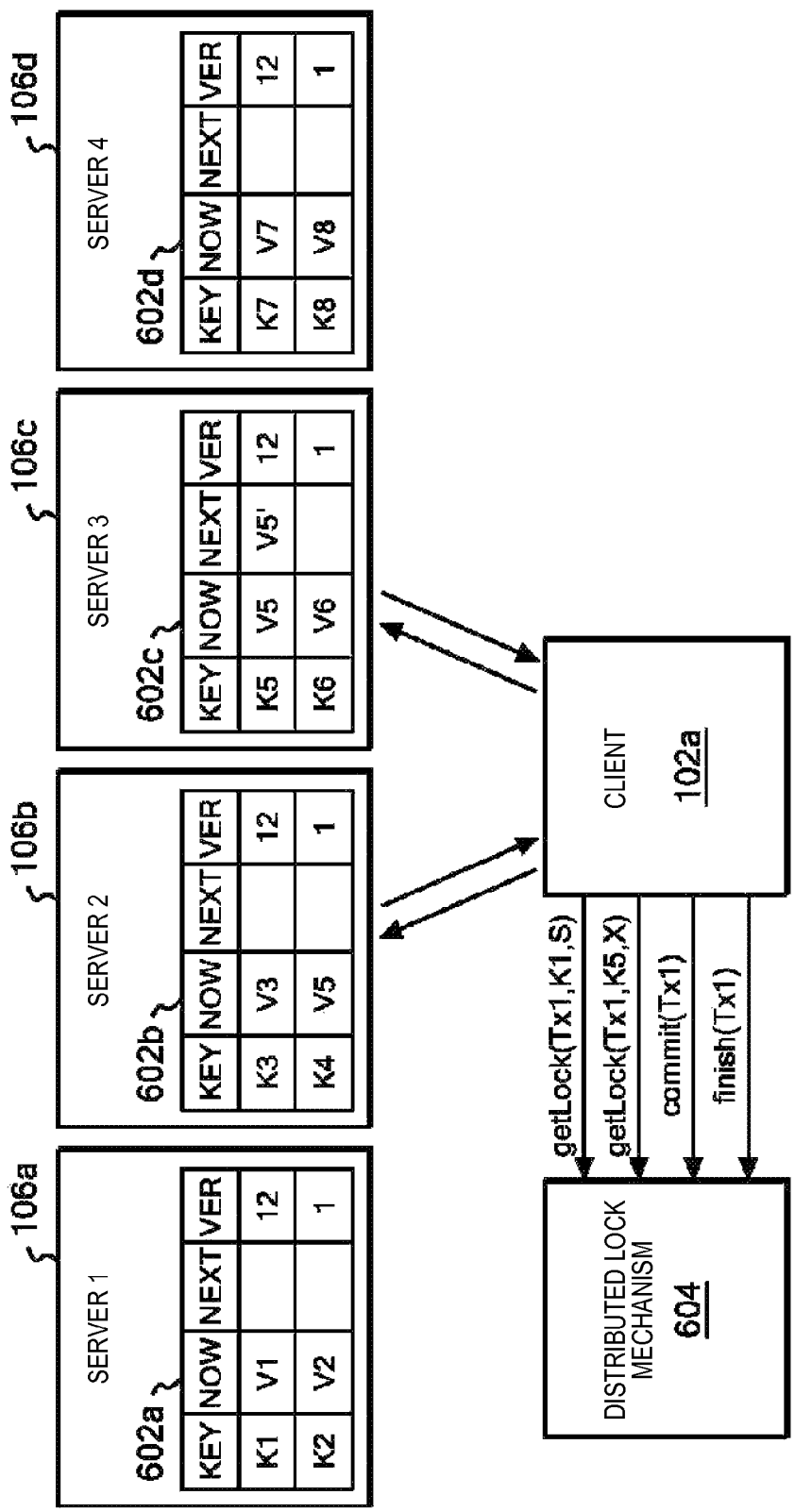
FIG. 6 is a diagram generally showing a conventional KVS system.

Therefore, a configuration of KVS as illustrated in FIG. 6 has been implemented. In this configuration, a field storing data is extended to add a NEXT field which stores a dirty update, and a VER field which stores a lock version as indicated by reference numerals 602a, 602b, 602c and 602d.

According to this configuration, a client 102a acquires a lock before accessing data. When updating, the client 102a writes a dirty update and the version of the lock. On the other hand, a distributed lock mechanism 604 is separately provided and manages the versions of committed locks. When there is a NEXT value even though the lock has been successfully acquired, the NEXT value is changed to a NOW value, the version of the lock is updated and the processing is continued. This mechanism enables implementation of distributed transactions. However, separately building the distributed lock mechanism 604 increases software development and management costs.

Figure 7:
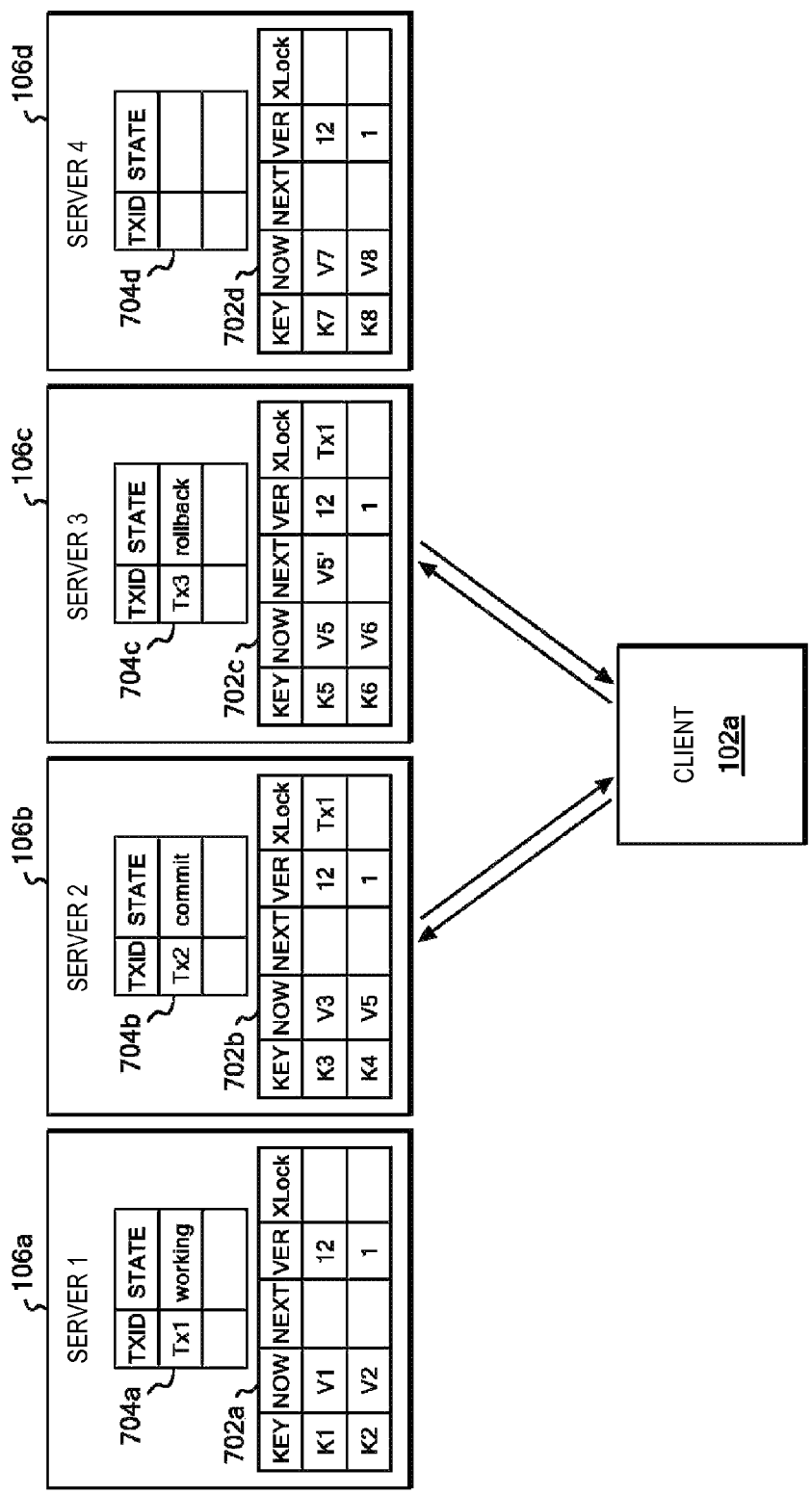
FIG. 7 is a diagram generally showing a conventional KVS system.

To avoid this, a KVS configuration that does not use a separate distributed lock mechanism, like the one illustrated in FIG. 7, has been proposed. In this configuration, management tables 704a, 704b, 704c and 704d, each of which includes transaction IDs (TxID) and the states of the transactions, for recording the states of transactions, are separately provided on servers 106a, 106b, 106c and 106d in addition to data tables 702a, 702b, 702c and 702d. In this configuration, a client 102a records a version it has queried and can commit only if the queried version has not been updated. After the commit, the state of the transaction is updated with another transaction and the value is updated.

When contention occurs, that is, when a plurality of clients attempts to update the same data in this configuration, the state of an existing transaction is changed to a rollback state. This enables implementation of distributed transactions but only optimistic transactions. Furthermore, while this configuration can be implemented by using existing products alone, frequent rollbacks take place when contention occurs, which can prevent improvement of performance.

Figure 8:
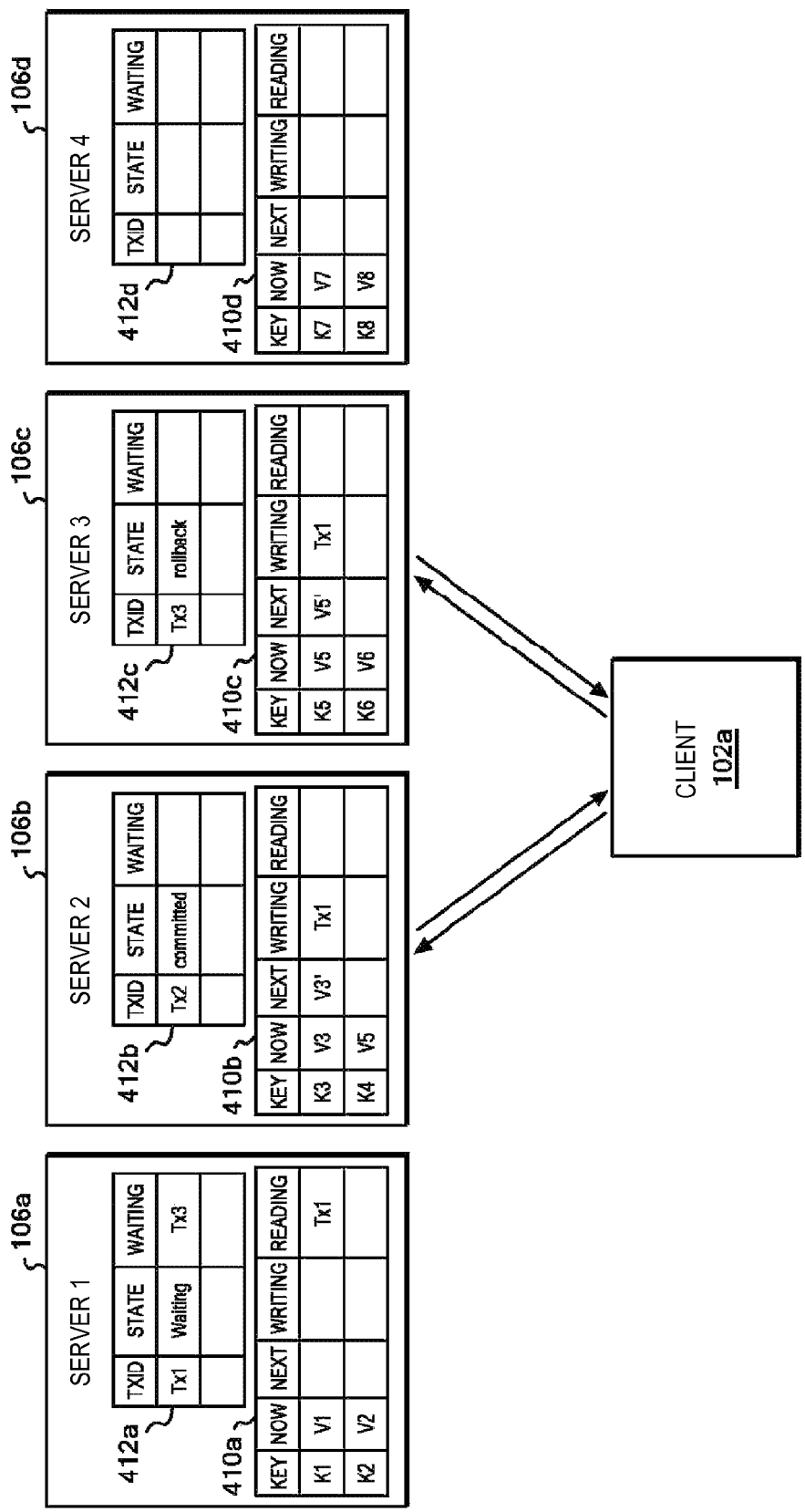
FIG. 8 is a diagram generally showing a KVS system of the present invention.

FIG. 8 illustrates a configuration of the present invention which is an improvement on a KVS configuration like the one illustrated in FIG. 7. Reference numerals used here correspond to those in the functional block diagram of FIG. 4. Specifically, management maps 412a, 412b, 412c and 412d including a global transaction ID (TxID), the state of the transaction, and the global transaction ID of a waiting global transaction are separately provided on servers 106a, 106b, 106c and 106d. The state of a transaction is stored in a STATE field and the global transaction ID of a waiting global transaction is stored in a WAITING field.

Tables (data maps) 410a, 410b, 410c and 410d that store data of KVS are also provided on the servers 106a, 106b, 106c and 106d. Each of the data maps 410a, 410b, 410c and 410d includes a KEY field which contains a key, a NOW field which contains a committed value, a NEXT field which contains a value that is currently being updated, a WRITING field which contains a global transaction ID, TxID in a lock state, that is, an update state, and a READING field which contains a global transaction ID, TxIDs, in a query state.

In this configuration, a client 102a updates information about a lock at every query and update. When contention for a lock occurs, the state of a transaction is updated and the state of a waiting transaction is monitored. After committing, the client 102a updates the state of the transaction and updates a value with another transaction.

When a plurality of clients attempts to update the same data, that is, when contention occurs, an existing lock mechanism is used to wait for the contending transaction(s) to end.

A data structure and an interface for processing of the present invention will be described below.

The following KVS map interface is assumed:

get (key): acquires a shared lock for a key and obtains the value associated with the key.

put (key, value): acquires an exclusive lock for a key and associates a value with the exclusive lock.

cas (key, prev, value): acquires an exclusive lock for a key and, if the value is prev, associates the value with the key.

remove (key): acquires an exclusive lock for a key and removes the value.

commit ( ): confirms an update to a key and releases all locks acquired.

Map configuration (The assumption is that an application uses a single distribution map.)

Map (TxStateMap) for managing the state of a transaction: Table such as tables 412a, 412b and 412c shown in FIG. 8.

key: TxID (global transaction ID)

value: State (Working|Committed|Rollbacked|Waiting) (STATE), waiting TxID (WAITING)

Map (DataMap) for data management and management of the state of a lock. This is a data map such as data maps 410a, 410b and 410c illustrated in FIG. 8.

key: Key specified by an application value: A commit confirmed value (NOW), a value currently being updated (NEXT), a global transaction ID in a lock state, that is, the ID of a global transaction that is currently updating (WRITING), a list of a global transaction ID that is currently querying (READING)

A client that is currently executing a transaction has the following states:

TxID
   Global transaction ID
   This is generated at the start of a transaction.

DirtyList
   Value of DataMap being updated

ReadingKeyList
   Key of DataMap being queried

In addition, FinishTxIDs are provided as finished TxID list

Processes according to the present invention will be described below with reference to the flowcharts of FIGS. 9 to 14. Throughout the operations in the flowcharts of FIGS. 9 to 14, basically a client computer issues instructions, processes are performed on a server in response to the instructions, and the server returns responses to the client as necessary.

Figure 9:
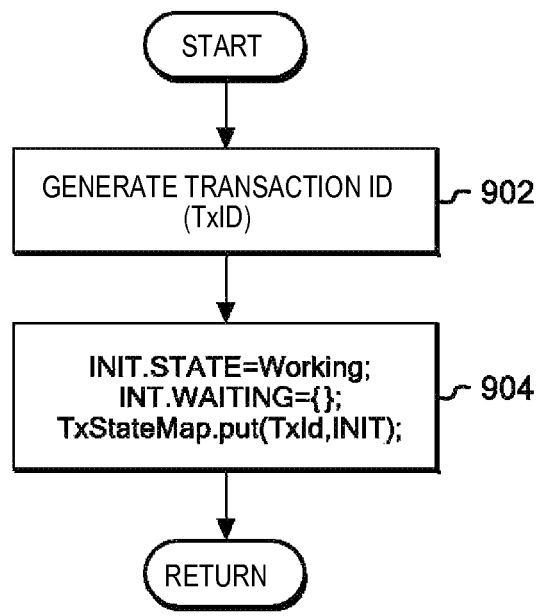
FIG. 9 is a flowchart of a process of starting a transaction.

FIG. 9 shows a flowchart of a process at the start of a transaction. The process is executed basically by any of application programs 402a, 402b, . . . , 402z on any of the client computers 102a, 102b, . . . , 102z.

At step 902, the client computer generates a global transaction ID TxID by adding a serial number that is incremented on the client computer to a unique ID of the client computer.

At step 904, the client computer 102a sets an initial state INIT.STATE=Working and INIT.WAITING={ } and executes put (TxID, INIT) on a map TxStateMap for transaction state management on the corresponding server 106a using the global transaction ID (TxID). At this point in time, the client computer 102a does not commit. The transaction for the management map is called management local transaction.

It should be noted that while the description is provided by taking the combination of the client computer 102a and the server 106a as an example, there can be any combination of any of client computers 102a, 102b . . . , 102z and servers 106a, 106b, . . . , 106z in practice. While actually the application program 402a on the client computer 102a executes a transaction with the server, such execution will be described as "the client computer 102a executes a transaction" in the following description for convenience.

Figure 10:
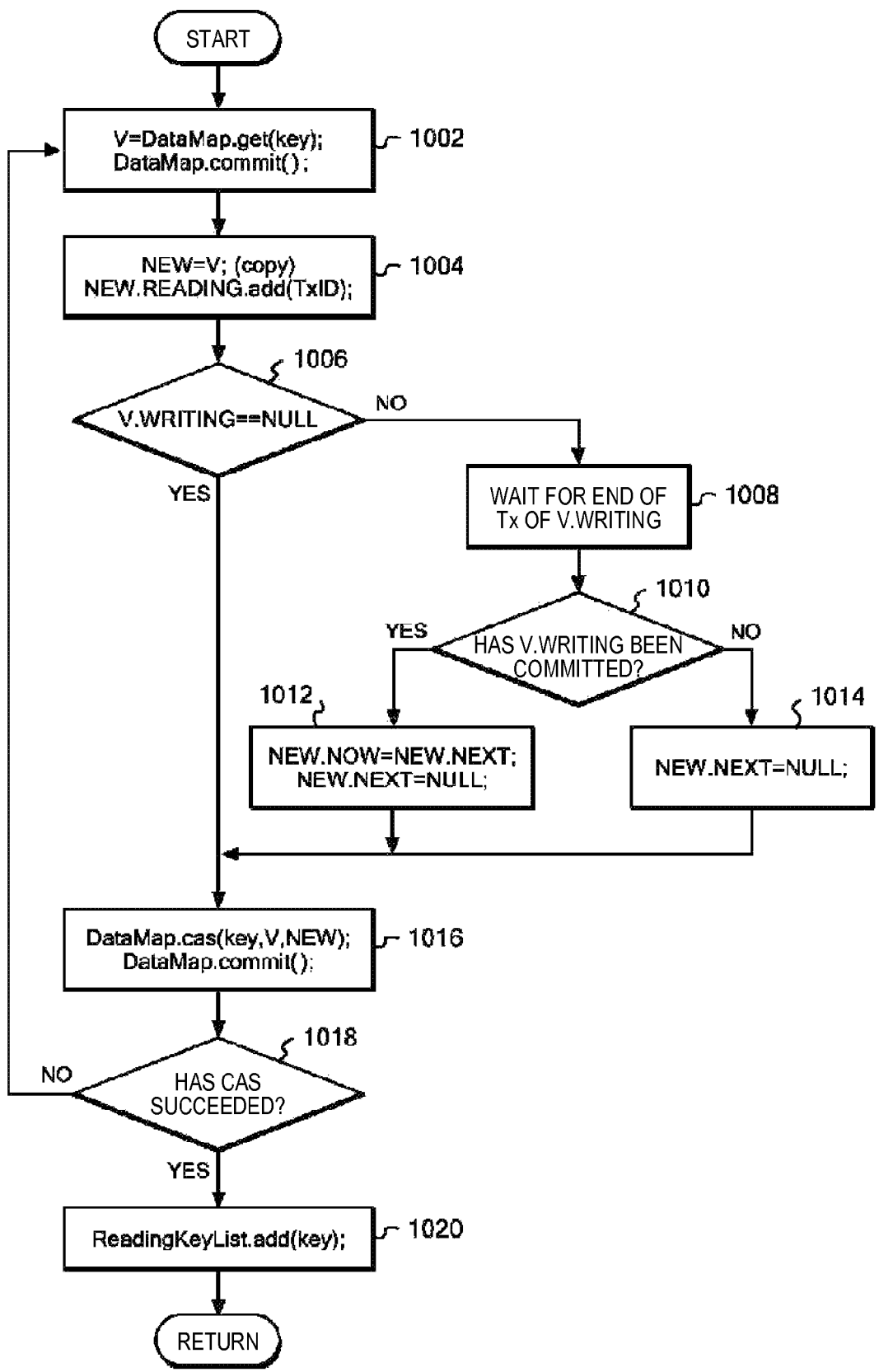
FIG. 10 is a flowchart of a process of querying.

FIG. 10 shows a flowchart of a process of querying, specifically, a process of querying a map for the value of a key. At step 1002 of FIG. 10, the client computer 102a sends a query, DataMap.put (key), to the transaction processing program 406a on the corresponding server 106a and stores an entry of the result of the query in V. The client computer 102a then commits by executing DataMap.commit ( ).

In response to an instruction from the client computer 102a, the server 106a first uses NEW=V to copy V in NEW and then executes NEW.READING.add (TxID) to store TxID in the READING field of the data map (DataMap) 410a at step 1004.

At step 1006, the server 106a determines whether or not V.WRITING==NULL. If not, the server 106a waits for the V.WRITING transaction to end at step 1008. At step 1010, the server 106a then determines whether or not V.WRITING has been committed. If committed, the server 106a stores NEW.NOW=NEW.NEXT and sets NEW.NEXT=NULL at step 1012; otherwise, the server 106a simply sets NEW.NEXT=NULL at step 1014. Then the process proceeds to step 1016.

If the server 106a determines at step 1006 that V.WRITING==NULL, the process directly proceeds to step 1016. At step 1016, the client computer 102a instructs the transaction processing program 406a to execute DataMap.cas (key, V, NEW) and then the transaction processing program 406a executes DataMap.commit ( ) to commit.

The server 106a determines at step 1018 whether or not CAS has succeeded. If succeeded, the server 106a executes ReadingKeyList.add (key) to add a key to ReadingKeyList and ends the process at step 1020. If the server 106a determines at step 1018 that CAS has failed, the process returns to step 1002.

Figure 11:
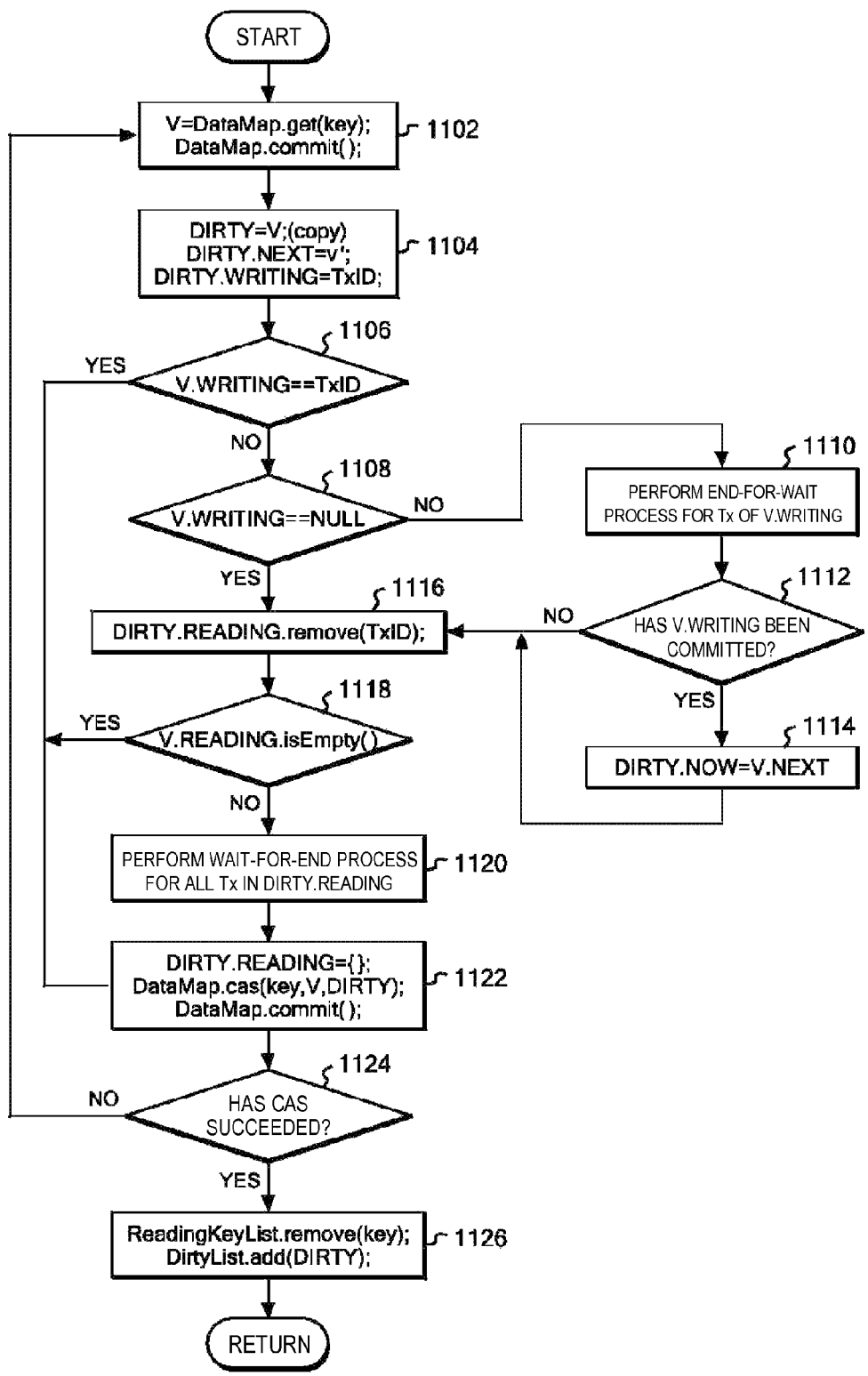
FIG. 11 is a flowchart of a process of updating.

FIG. 11 shows a flowchart of an update process, that is, a process of updating the value of a key to v' on the map. At step 1102 of FIG. 11, the client computer 102a issues a query, DataMap.put (key), to the transaction processing program 406a and then the server 106a stores an entry of the result of the query in V. The server 106a then executes DataMap.commit ( ) to commit.

At step 1104, the server 106a first uses DIRTY=V to copy V in DIRTY, sets DIRTY.NEXT=v', and sets DIRTY.WRITING=TxID.

At step 1106, the server 106a determines whether or not V.WRITING==TxID. If not, the server 106a determines at step 1108 whether or not V.WRITING==NULL. If not, the server 106a waits for termination processing of Tx of V.WRITING at step 1110. Then, at step 1112, the server 106a determines whether or not V.WRITING has been committed. If committed, the server 106a sets DIRTY.NOW=V.NEXT and the process proceeds to step 1116. If V.WRITING has not been committed, the process directly proceeds to step 1116. On the other hand, if it is determined at step 1108 that V.WRITING==NULL, the process directly proceeds to step 1116.

At step 1116, the server 106a executes DIRTY.READING.remove (TxID) to remove TxID from DIRTY.READING.

At step 1118, the server 106a executes V.READING.isEmpty ( ) to determine whether or not V.READING is empty. If it is empty, the server 106a proceeds to step 1122; otherwise, the server 106a performs wait-for end processing for all transaction in DIRTY.READING.

In this way, if the determination is YES at step 1106, or the determination is YES at step 1118, or following step 1120, the server 106a executes DIRTY.READING={ }, DataMap.cas (key, V, DIRTY), and DataMap.commit ( ) at step 1122.

At step 1124, the server 106a determines whether or not CAS has succeeded. If succeeded, the server 106a executes ReadingKeyList.remove (key) to remove the key from ReadingKeyList and executes DirtyList.add (DIRTY) to add DIRTY to DirtyList. On the other hand, if the server 106a determines that CAS has failed, the process returns to step 1102.

Figure 12:
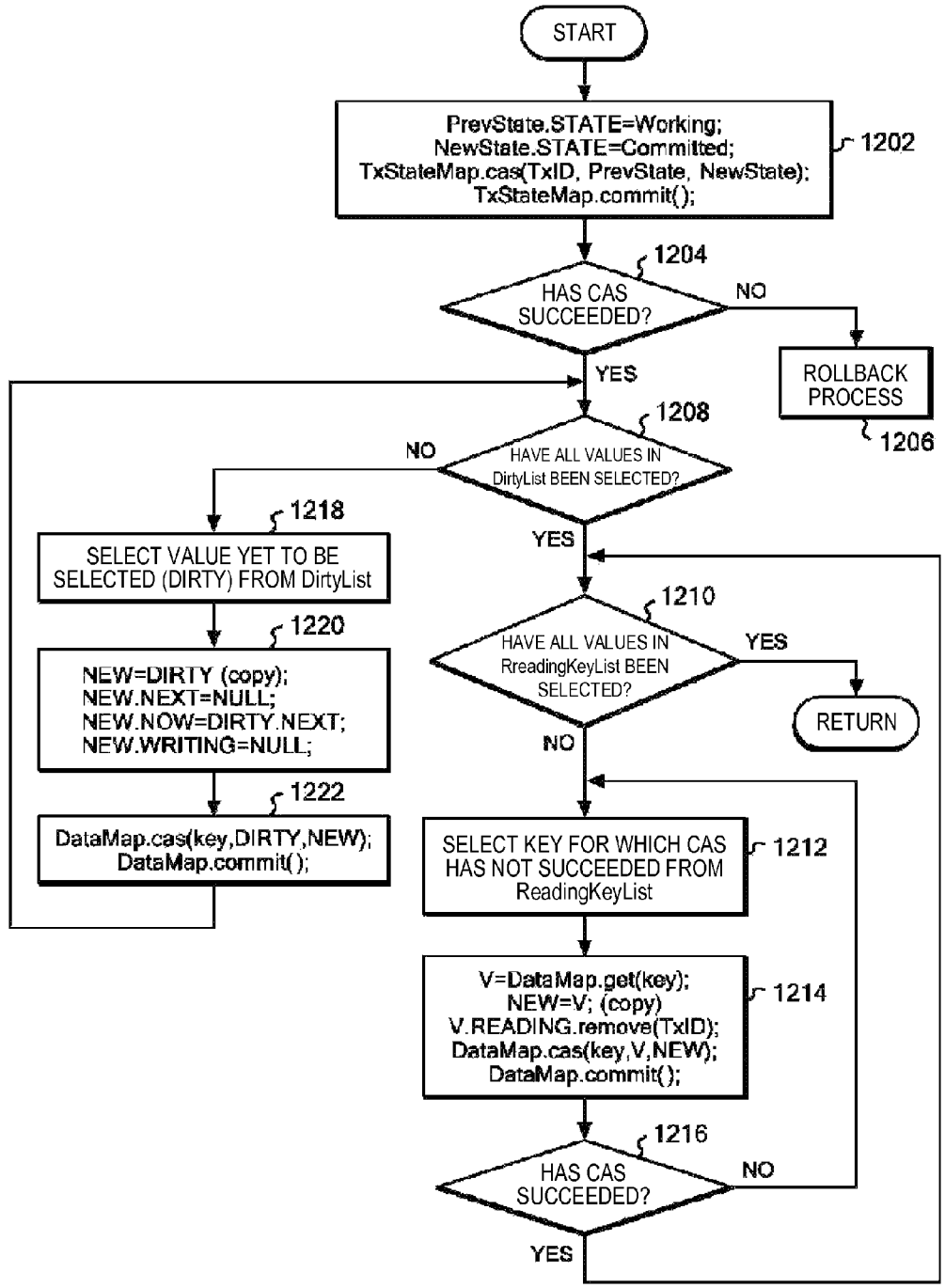
FIG. 12 is a flowchart of a process of committing.

FIG. 12 shows a flowchart of a commit process. When a commit is to be made, Working is set in PrevState.STATE, which represents the previous state, Committed is set in NewState.STATE, which represents a new state, and TxStateMap.cas (TxID, PrevState, NewState) is executed, then TxStateMap.commit( ) is executed.

At the next step, 1204, the server 106a determines whether or not CAS has succeeded. If not, the server 106a proceeds to the rollback process at step 1206. The failure of CAS here means that CAS has been forced to abort by another transaction.

On the other hand, if CAS has succeeded, the server 106a determines at step 1208 whether all values in DirtyList have been selected. If selected, the server 106a determines at step 1210 whether all values in ReadingKeyList have been selected. If not, the server 106a selects a key for which CAS has not succeeded from ReadingKeyList at step 1212 and executes
V=DataMap.get (key)
NEW=V
V.READING.remove (TxID)
DataMap.cas (key, V, NEW)
DataMap.commit ( )
at step 1214. The server 106a returns to step 1212 unless CAS is successful. When CAS has succeeded, the process proceeds to step 1210 and, when it is determined at step 1210 that all values in ReadingKeyList have been selected, the process ends.

Returning to step 1208, if the server 106a determines that not all values in DirtyList have been selected, the server 106a selects a value that has not been selected in DirtyList at step 1218, then executes
NEW=DIRTY
NEW.NEXT=NULL
NEW.NOW=DIRTY.NEXT
NEW.WRITING=NULL
at step 1220, executes DataMap.cas (key, DIRTY, NEW) and DataMap.commit ( ) at step 1222, then returns to step 1208.

Figure 13:
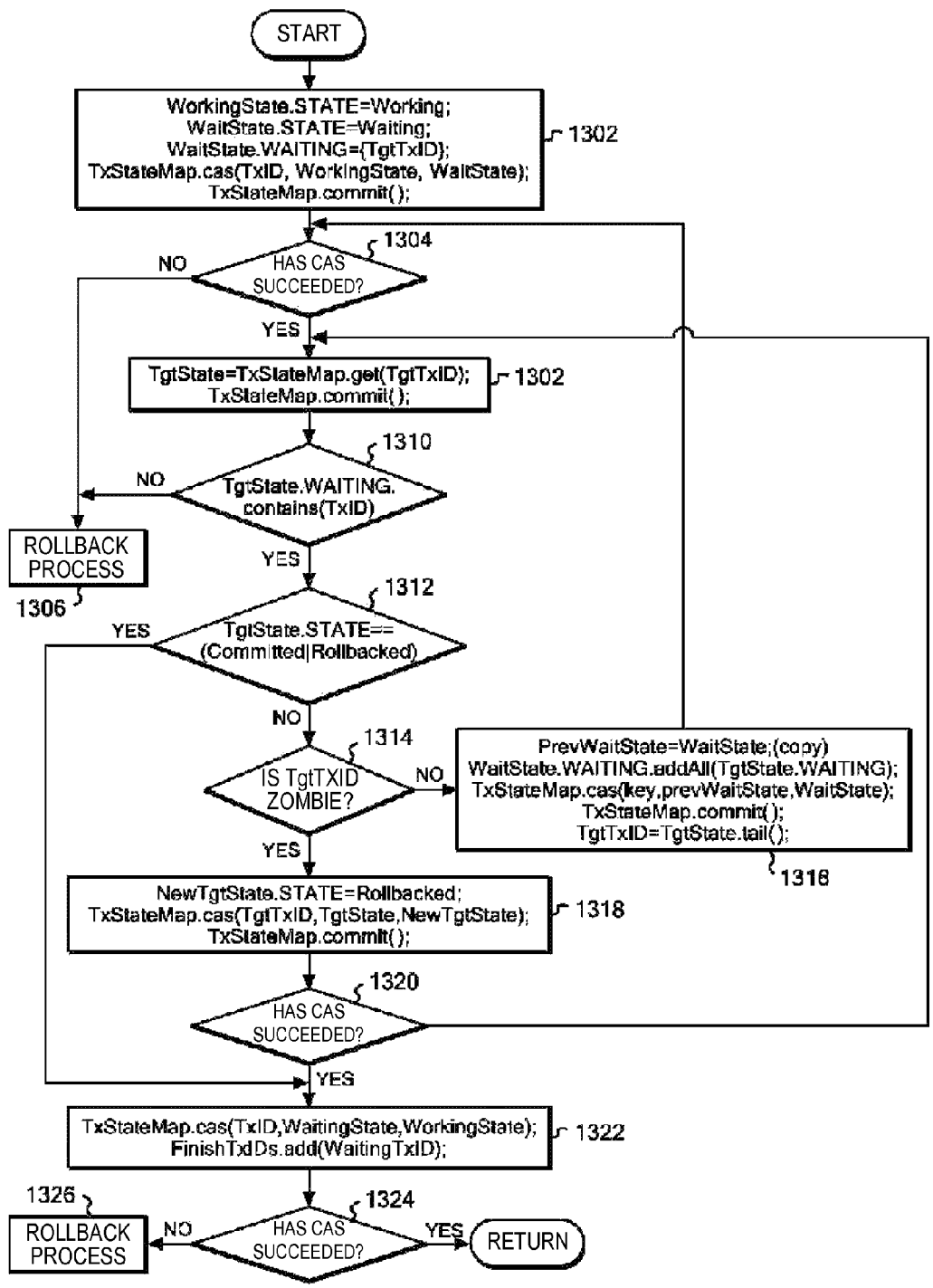
FIG. 13 is a flowchart of a process of a transaction to wait for the end of another transaction.

FIG. 13 shows a flowchart of a process of a global transaction having a global transaction ID, TxID, to wait for the end of a transaction having a global transaction ID, TgtTxID. At step 1302, the client computer 102a causes the transaction processing program 406a on the server 106a to execute
WorkingState.STATE=Working
WaitState.STATE=Waiting
WaitState.WAITING={TgtTxID}
TxStateMap.cas (TxID, WorkingState, WaitState)
TxStateMap.commit ( ).

Then, at step 1304, the server 106a determines whether or not CAS has succeeded. If CAS has failed, it means that CAS has been forced to abort by another transaction and therefore a rollback process is performed at step 1306.

If the server 106a determines that CAS has succeeded, the server 106a executes TgtState=TxStateMap.get (TgtTxID) and then TxStateMap.commit ( ) at step 1308. Here, get is executed only when the transaction having TgtTxID is Waiting, Committed, or Rollbacked.

At step 1310, the server 106a determines whether or not TgtState.WAITING.contained (TxID), that is, whether or not WAITING of TgtState contains TxID. If not, the server 106a assumes that there is a possibility of a deadlock and performs a rollback process at step 1306.

If the server 106a determines at step 1310 that WAITING of TgtState contains TxID, the server 106a determines at step 1312 whether TgtState.STATE is any of Committed and Rollbacked. If so, the server 106a proceeds to step 1322, where the server 106a executes TxStateMap.cas (TxID, WaitState, WorkingState) and FinishTxID.add (WaitingTxID), and determines at step 1324 whether or not CAS has succeeded as a result of the execution. If succeeded, the process ends; otherwise a rollback process is performed at step 1326.

Returning to step 1312, if TgtState.STATE is not Committed nor Rollbacked, the server 106a determines at step 1314 whether TgtTxID is zombie, that is, long Waiting. If so, the server 106a proceeds to step 1318, where the server 106a executes the following process:
NewTgtStage.STATE=Rollbacked
TxStateMap.cas (TgtTxID, TgtState, NewTgtState)
TxStateMap.commit( )

At step 1320, the server 106a determines whether or not CAS has succeeded. If succeeded, the server 106a proceeds to step 1322; otherwise the server 106a returns to step 1308.

Returning to step 1314, if the server 106a determines that TgtTxID is not zombie, the server 106a proceeds to step 1316, where the server 106a executes the following process:
PrevWaitState=WaitState
//This copies WaitState to PrevWaitState.
WaitState.WAITING.addAll (TgtState.WAITING)
//This adds all global transaction IDs in WaitState.WAITING to WaitState.WAITING.
TxStateMap.cas (key, prevWaitState, WaitState)
TxStateMap.commit ( )
TgtTxID=TgtState.tail ( )
//This assigns the global transaction ID listed at the tail of TgtState.WAITING to TgtTxID.
Then the process returns to step 1304.

Figure 14:
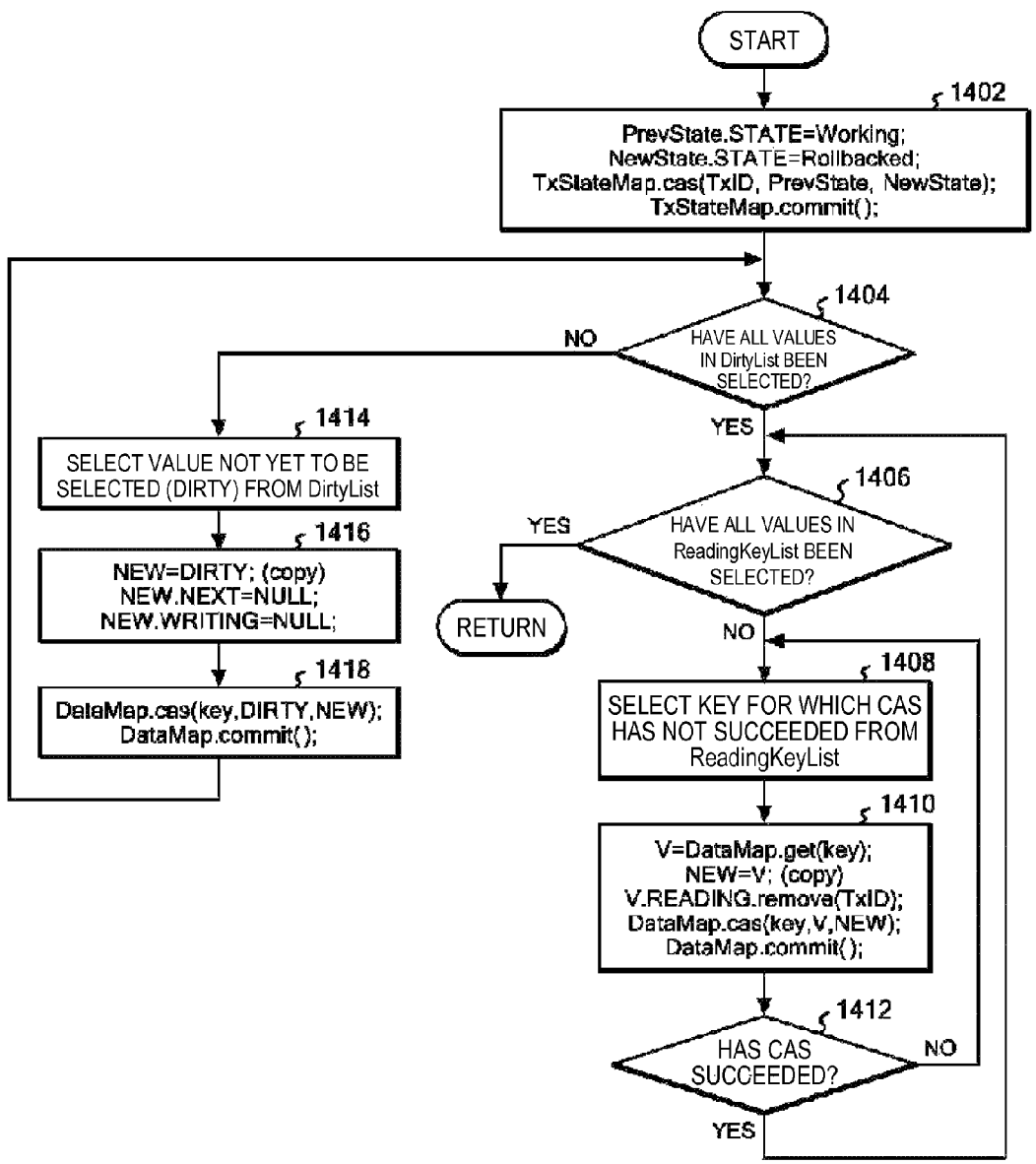
FIG. 14 is a flowchart of a process of rollback.

FIG. 14 shows a flowchart of a rollback process. At step 1402 in FIG. 14, Working is set in PrevState.STATE, which represents the previous state, Committed is set in NewState.STATE, which represents a new state, and TxStateMap.cas (TxID, PrevState, NewState) is executed, then TxStateMap.commit ( ) is executed.

Then, at step 1404, the server 106a determines whether all values in DirtyList have been selected. If so, at step 1406, the server 106a determines whether all values in ReadingKeyList have been selected. Otherwise, the server 106a selects a key for which CAS has not succeeded from ReadingKeyList and executes
V=DataMap.get (key)
NEW=V
V.READING.remove (TxID)
DataMap.cas (key, V, NEW)
DataMap.commit ( )
at step 1410. The server 106a returns to step 1408 unless CAS is successful. When it is determines at step 1210 that all values in ReadingKeyList have been selected, the process ends.

Returning to step 1208, if the server 106a determines that not all values in DirtyList have been selected, the server 106a selects at step 1414 a value (DIRTY) that has not been selected in DirtyList, and executes NEW=DIRTY
NEW.NEXT=NULL
NEW.NOW=DIRTY.NEXT
NEW.WRITING=NULL
at step 1416, executes DataMap.cas (key, DIRTY, NEW) and DataMap.commit ( ) at step 1418, then returns to step 1404.

A number of typical exemplary processes of the present invention will be described below with reference to examples in FIGS. 15 to 18. For convenience of explanation, values of NOW and NEXT on a data map (DataMap) will be omitted in the following description. In FIGS. 15 to 18, "s" denotes a shared lock (Shared) and "x" denotes an exclusive lock (eXclusive).

Figure 15:
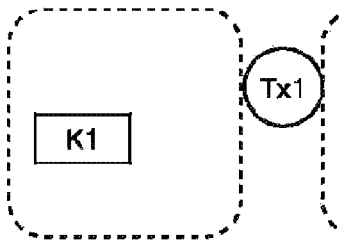
FIG. 15 is a diagram illustrating an exemplary process of a transaction.
Figure 15:
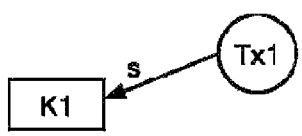
Figure 15:
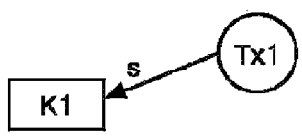
Figure 15:
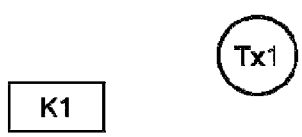

First, FIG. 15 illustrates an example in which Tx1 queries K1 and then commits. In 1 in FIG. 15, a client computer initiates a transaction Tx1. As a result, Tx1 is stored in KEY on a management map 412a and STATE becomes Working. In 2 in FIG. 15, Tx1 acquires a shared lock, K1, which is then stored in KEY on a data map 410a and {Tx1} is stored in READING on the data map 410a.

In 3 in FIG. 15, a commit process of Tx1 is performed and STATE on the management map 412 becomes Committed. In 4 in FIG. 15, another commit process of Tx1 is performed and READING on the data map 410a becomes { }.

Figure 16:
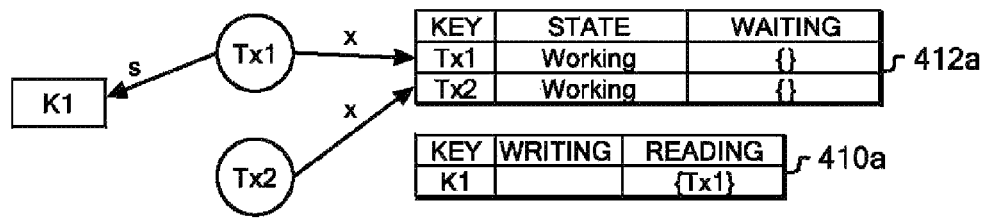
FIG. 16 is a diagram illustrating an exemplary process of a transaction.
Figure 16:
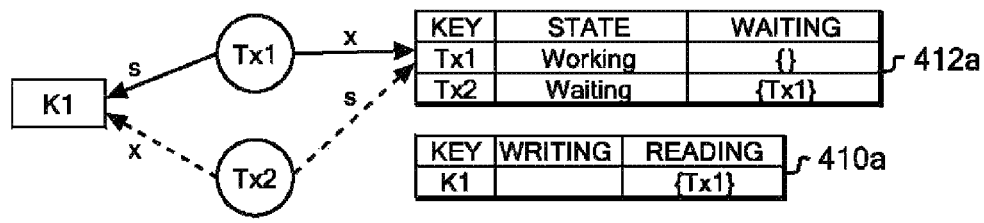
Figure 16:
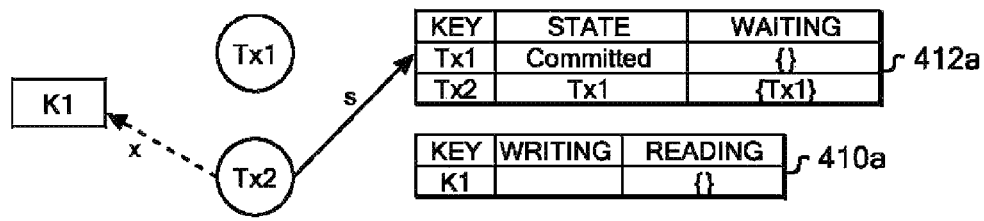
Figure 16:
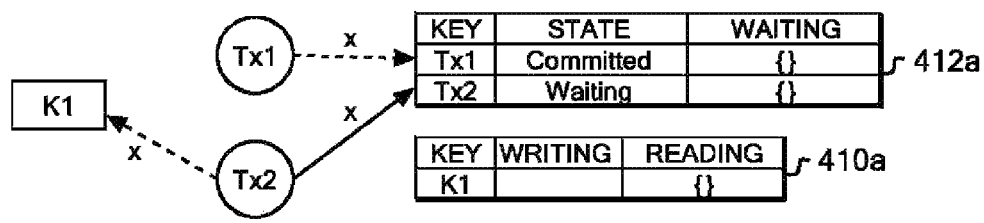
Figure 16:
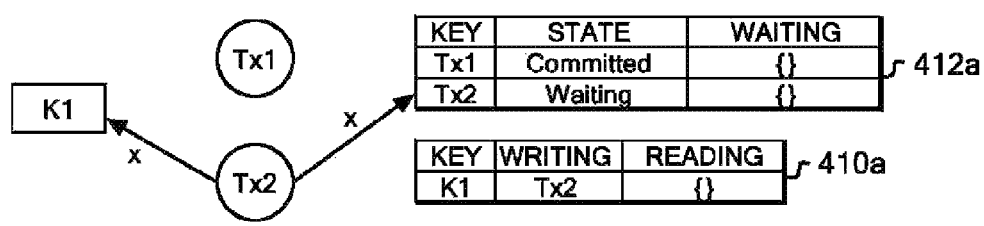

FIG. 16 illustrates an example in which Tx2 attempts to update K1 while Tx1 is querying K1 and, after Tx1 has committed, the update is processed. In FIG. 16, 1 represents that Tx1 is querying K1. In 2 in FIG. 16, Tx2 attempts to acquire the shared lock K1. However, the query by Tx2 is blocked because Tx1 is querying K1. {Tx1} is placed in Waiting of the entry of KEY=Tx2 on the management map 412a.

After the commit process of Tx1 has ended, Tx2 is allowed to query in 3 in FIG. 16. At 4 in FIG. 16, Tx2 reattempts to acquire the shared lock K1. In response to this, STATE in the entry of KEY=Tx2 on the management map 412a becomes Working and WAITING becomes { }. In 5 in FIG. 16, an update process of Tx2 is started and Tx2 is stored in WRITING corresponding to Key=K1 on the data map 410a.

Figure 17:
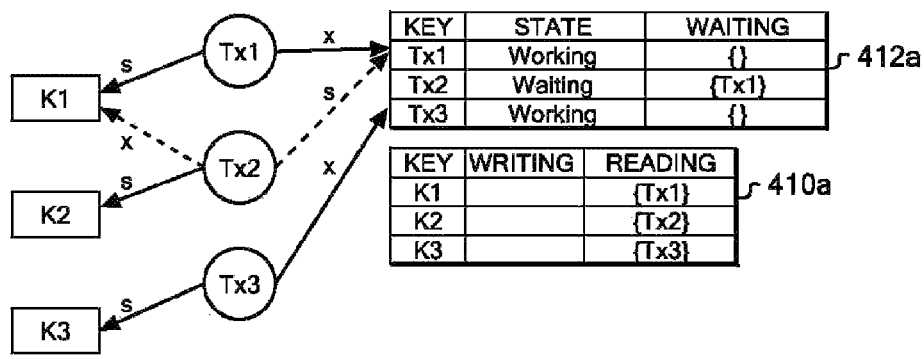
FIG. 17 is a diagram illustrating an exemplary process of a transaction.
Figure 17:
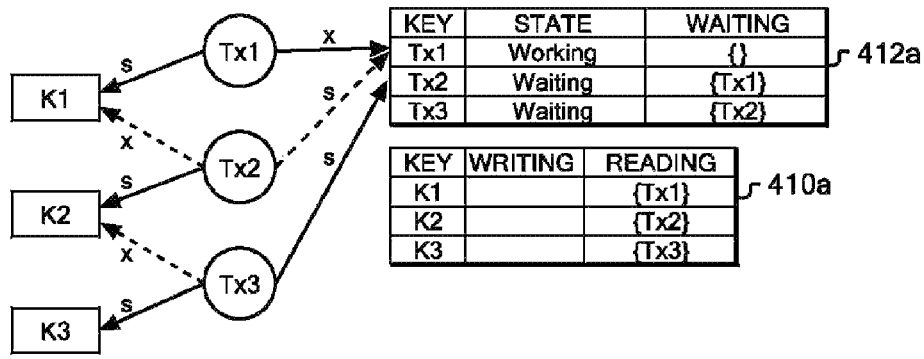
Figure 17:
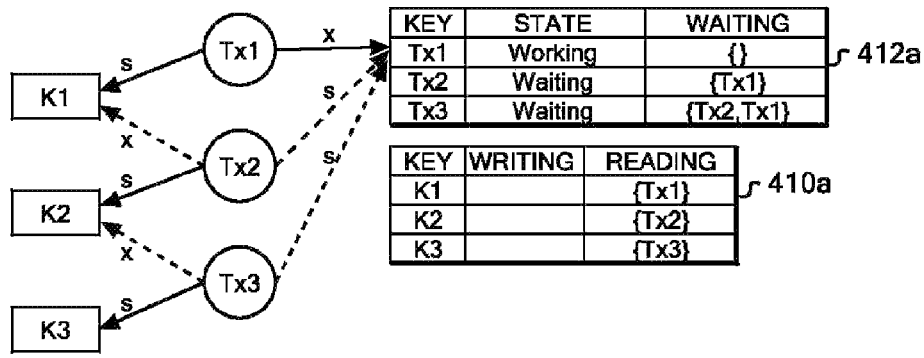
Figure 17:
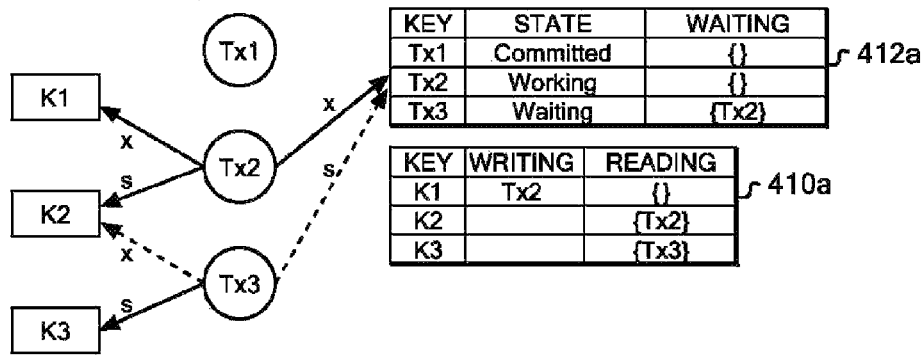

FIG. 17 illustrates an example in which Tx2 waits for Tx1 to end, Tx3 waits Tx2 to end and, upon the end of Tx1, Tx2 starts working whereas Tx3 is still waiting Tx2 to end. In 1 in FIG. 17, Tx2 is waiting for Tx1 to commit, as indicated by an entry of the management map 412a. In 2 in FIG. 17, Tx3 starts updating K2 which is being queried by Tx2. Here, Tx3 recognizes that Tx2 is waiting for Tx1 to end.

In 3 in FIG. 17, Tx3 enters the Tx1 wait state. This is indicated by the entry, {Tx2, Tx1}, of WAITING corresponding to KEY=Tx3 of the management map 412a. In 4 in FIG. 17, it is shown that after Tx1 has been committed and ended, Tx3 enters the Tx2 wait state.

Figure 18:
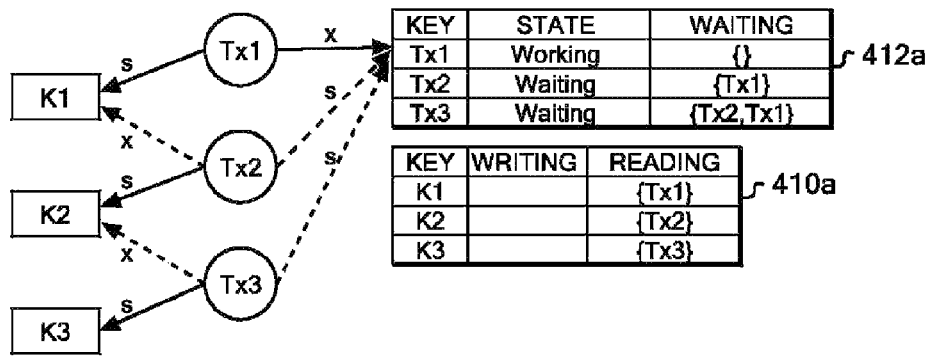
FIG. 18 is a diagram illustrating an exemplary process of a transaction.
Figure 18:
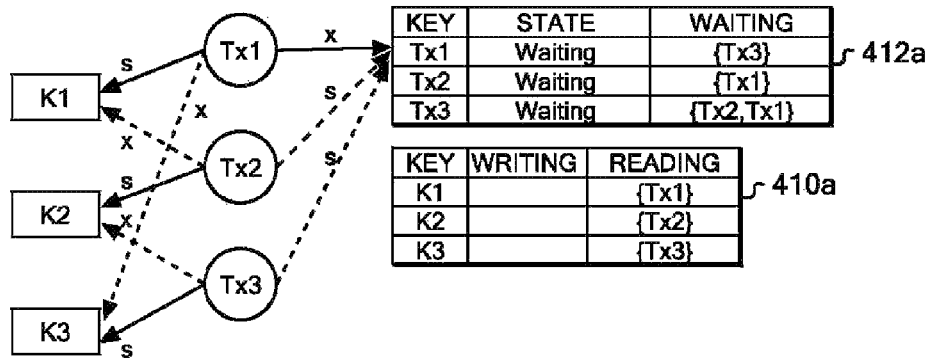
Figure 18:
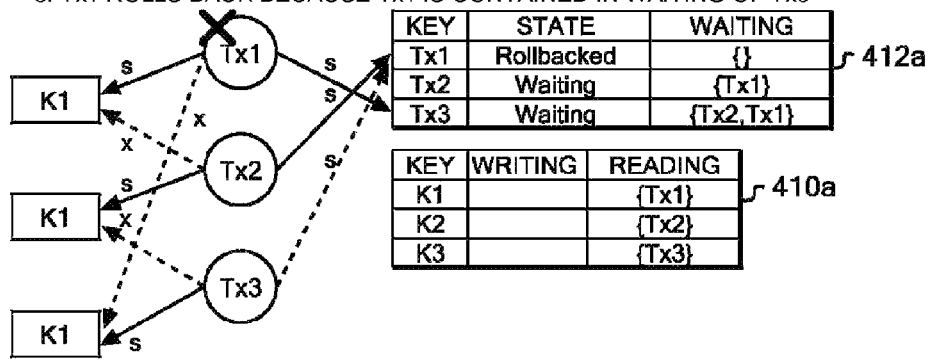
Figure 18:
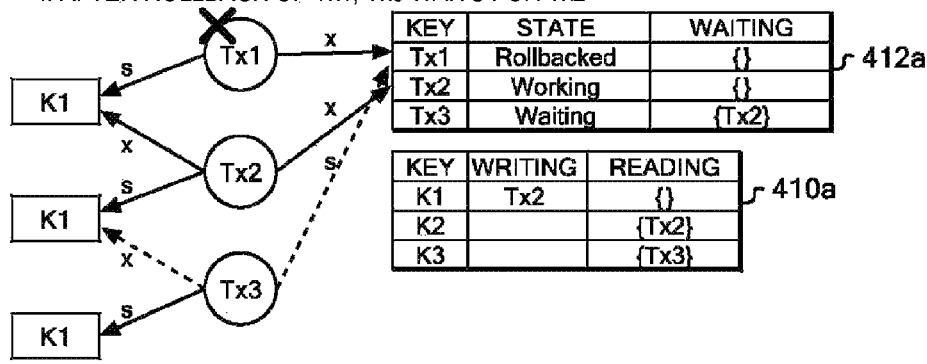

FIG. 18 illustrates an example of a process in which when Tx1, Tx2 and Tx3 encounter a deadlock, Tx1 rolls back. In 1 in FIG. 18, Tx1 and Tx3 enter the Tx1 wait state. In 2 in FIG. 18, Tx1 attempts to update a value that is being queried by Tx3.

However, as illustrated in 3 in FIG. 18, Tx1 rolls back because WAITING of the entry corresponding to Tx3 contains Tx1 as can be seen from entries of the management map 412a.

Then, as illustrated in 4 in FIG. 18, after the rollback of Tx1, Tx1 is removed from the WAITING field of the entries of Tx2 and Tx3 of the management map 412a, and Tx3 enters the Tx2 wait state. Here, if Tx2 and Tx3 query STATE of Tx1 before STATE of Tx1 is set to Rollbacked, all of the transactions roll back but the atomicity of the transactions is guaranteed.

While an embodiment of the present invention on a particular hardware and software platform has been described, it will be apparent to those skilled in the art that the present invention can be embodied on any computer hardware and platform.

I claim:

1. In a distributed key value store system which includes a plurality of servers, each having an exclusive control mechanism, and in which transaction atomicity and isolation on each of the servers are guaranteed, a distributed key-value-store system control method for implementing global transaction processing that preserves transaction atomicity and isolation on all of the servers by combining local transaction processes on the servers, the method comprising the steps of:

providing beforehand a management map including a global transaction ID as a key and a state of global transaction, a waiting global transaction ID list as a value before any global transaction is started;

starting a management local transaction on one of the plurality of servers by processing by the computer when a global transaction process is started;

inserting a key-value pair including an ID of the global transaction process as a key and initializing a transaction state field to a "working" value, and initializing a waiting state field as a null value into the management map in the management local transaction, said management local transaction not ending until a commit or rollback of the global transaction process; and updating each of the transaction state field value and the waiting state field value for the ID of the global transaction process as a key to a respective transaction state value "waiting", and a waiting global transaction ID list value for the global transaction process on the management map in the management local transaction and committing the management local transaction;

starting a wait-for-lock-release transaction on the server that manages a waiting global transaction ID at a tail of the waiting global transaction ID list for the global transaction process as a key of the management map and querying a value having a waiting global transaction ID as a key; and in response to that the value queried does not exist on the management map or that the state of a waiting global transaction in the value is either committed or aborted, committing the wait-for-lock-release transaction, restarting the management local transaction, and updating a value having a global transaction ID as a key to one of a state "working", null to notify that lock contention has ended, by processing by the computer.

2. The method according to claim 1, further comprising the steps of:

starting a wait-for-lock-release transaction on the server that manages a waiting global transaction ID as a key of the management map and querying a value having the waiting global transaction ID as a key; and when the value queried on the management map is a state "waiting", a waiting global transaction ID list for a waiting global transaction, committing the wait-for-lock-release local transaction, adding a waiting global transaction ID list for a waiting global transaction to the waiting global transaction ID list of the global transaction process to generate a new waiting global transaction ID list for the global transaction process, restarting the management local transaction, updating a value having the ID of the global transaction process to a state "waiting", the new waiting global transaction ID list for the global transaction process, committing the management local transaction, and setting the global transaction ID at a tail of the new waiting global transaction ID list for the global transaction process as a waiting global transaction ID and performing waiting processing for the global transaction.

3. The method according to claim 1, further comprising the step of, when the global transaction process is committed, updating the value having the ID of the global transaction process to committed, { } value in the management local transaction and committing the management local transaction.

4. The method according to claim 1, further comprising the step of, when the global transaction process is rolled back, updating the value having the ID of the global transaction process as a key to one of aborted, { } in the management local transaction and committing the management local transaction.

5. A non-transitory computer readable storage medium tangibly embodying a computer readable program code having computer readable instructions which, when implemented, cause a computer to carry out the steps of a method of global transaction processing that preserves transaction atomicity and isolation on all servers by combining local transaction processes on the servers, the method comprising the steps of:

providing beforehand a management map including a global transaction ID as a key and a state of global transaction, a waiting global transaction ID list as a value before any global transaction is started;

starting a management local transaction on one of the plurality of servers by processing by the computer when a global transaction process is started;

inserting a key-value pair including an ID of the global transaction process as a key and initializing a transaction state field to a "working" value, and initializing a waiting state field as a null value into the management map in the management local transaction, said management local transaction not ending until a commit or rollback of the global transaction process; and updating each of the transaction state field value and the waiting state field value for the ID of the global transaction process as a key to a respective transaction state value "waiting", and a waiting global transaction ID list value for the global transaction process on the management map in the management local transaction and committing the management local transaction;

starting a wait-for-lock-release transaction on the server that manages a waiting global transaction ID at a tail of the waiting global transaction ID list for the global transaction process as a key of the management map and querying a value having a waiting global transaction ID as a key; and in response to that the value queried does not exist on the management map or that the state of a waiting global transaction in the value is either committed or aborted, committing the wait-for-lock-release transaction, restarting the management local transaction, and updating a value having a global transaction ID as a key to one of a state "working", null to notify that lock contention has ended.

6. The non-transitory computer readable storage medium according to claim 5, further comprising the steps of:

by processing by the computer, starting a wait-for-lock-release transaction on the server that manages a waiting global transaction ID as a key of the management map and querying a value having the waiting global transaction ID as a key; and when the value queried on the management map is a state "waiting", a waiting global transaction ID list for a waiting global transaction value, committing the wait-for-lock-release local transaction, adding a waiting global transaction ID list for a waiting global transaction to the waiting global transaction ID list of the global transaction process to generate a new waiting global transaction ID list for a global transaction to be processed, restarting the management local transaction, updating a value having the ID of the global transaction process to a state "waiting", the new waiting global transaction ID list for the global transaction process value, committing the management local transaction, and setting the global transaction ID at a tail of the new waiting global transaction ID list for the global transaction process as a waiting global transaction ID and performing waiting processing for the global transaction.

7. The non-transitory computer readable storage medium according to claim 5, further comprising the step of, when the global transaction process is committed, updating the value having the ID of the global transaction process as a key to one of committed, { } in the management local transaction and committing the management local transaction.

8. The non-transitory computer readable storage according to claim 5, further comprising the step of, when the global transaction is rolled back, updating the value having the ID of the global transaction process as a key to one of aborted, { } in the management local transaction and committing the management local transaction.

9. In a distributed key value store system which includes a plurality of servers having an exclusive control mechanism and in which transaction atomicity on each of the servers is guaranteed, a system which implements global transaction processing that preserves transaction atomicity and isolation on all of the servers by combining local transaction processes on the servers, the system comprising:

a memory unit;

a processor device coupled to the memory, the processor device configured to:

provide in the memory beforehand a management map including a global transaction ID as a key and a state of global transaction, a waiting global transaction ID list as a value before any global transaction is started;

start a management local transaction on one of the plurality of servers by processing by a computer when a global transaction process is started;

insert a key-value pair including an ID of the global transaction process as a key and initialize a transaction state field to a "working" value, and initialize a waiting state field as a null value into the management map in the management local transaction, said management local transaction not ending until a commit or rollback of the global transaction process; and update each of the transaction state field value and the waiting state field value for the ID of the global transaction process as a key to a respective transaction state value "waiting", and a waiting global transaction ID list value for the global transaction process on the management map in the management local transaction and committing the management local transaction wherein the processor device is further configured to:

start a wait-for-lock-release transaction on the server that manages a waiting global transaction ID at a tail of the waiting global transaction ID list for the global transaction process as a key of the management map and querying a value having a waiting global transaction ID as a key; and in response to that the value queried does not exist on the management map or that the state of a waiting global transaction in the value is either committed or aborted, commit the wait-for-lock-release transaction, restarting the management local transaction, and update a value having a global transaction ID as a key to one of a state "working", null to notify that lock contention has ended.

10. The system according to claim 9, wherein the processor device is further configured to:

when the global transaction process is committed, update the value having the ID of the global transaction process as a key to one of committed, { } in the management local transaction and committing the management local transaction.

11. The system according to claim 9, wherein the processor device is further configured to:

when the global transaction process is rolled back, update the value having the ID of the global transaction process as a key to one of aborted, { } in the management local transaction and committing the management local transaction.

* * * * *